(12) United States Patent
Catovic et al.

(10) Patent No.: US 11,997,698 B2
(45) Date of Patent: May 28, 2024

(54) BROADCAST CONTROL CHANNEL DECODING IN DEDICATED CARRIER

(71) Applicant: QUALCOMM Incorporated, San Diego, CA (US)

(72) Inventors: Amer Catovic, Carlsbad, CA (US); Alberto Rico Alvarino, San Diego, CA (US); Ayan Sengupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 291 days.

(21) Appl. No.: 16/874,342

(22) Filed: May 14, 2020

(65) Prior Publication Data

US 2020/0367202 A1 Nov. 19, 2020

Related U.S. Application Data

(60) Provisional application No. 62/849,777, filed on May 17, 2019.

(51) Int. Cl.
*H04W 72/30* (2023.01)
*H04L 1/1607* (2023.01)
(Continued)

(52) U.S. Cl.
CPC .......... *H04W 72/30* (2023.01); *H04L 1/1614* (2013.01); *H04L 1/1642* (2013.01);
(Continued)

(58) Field of Classification Search
CPC . H04W 72/005; H04W 4/06; H04W 72/0446; H04W 4/70; H04W 72/0406;
(Continued)

(56) References Cited

U.S. PATENT DOCUMENTS

2014/0219237 A1* 8/2014 Charbit .................. H04L 5/005
370/330
2015/0289280 A1* 10/2015 Davydov .............. H04L 5/0053
370/252

(Continued)

OTHER PUBLICATIONS

Garro et al., "Air Interface", grant No. 761498, 5G-Xcast_WP3_D3.2_v2.00 public on Nov. 30, 2018 (Year: 2018).*

(Continued)

*Primary Examiner* — Thinh D Tran
(74) *Attorney, Agent, or Firm* — Holland & Hart LLP

(57) ABSTRACT

Methods, systems, and devices for wireless communications are described. Generally, a base station may indicate in system information, or a user equipment (UE) may determine based on system information, which reference signal resources may be used for channel estimation for a given broadcast control channel. In some examples, a base station may configure and transmit reference signals having the same numerology as a broadcast control channel according to a first reference signal pattern during the same subframe in which the broadcast control channel is configured. The first reference signal pattern may be more dense than a second reference signal pattern used for reference signals having a different numerology than the broadcast control channel. The more dense first reference signal pattern may provide sufficient reference signals for successful single-symbol channel estimation, resulting in a successful decoding of the broadcast control channel.

23 Claims, 20 Drawing Sheets

(51) Int. Cl.
*H04L 5/00* (2006.01)
*H04W 4/06* (2009.01)
*H04W 72/0446* (2023.01)

(52) U.S. Cl.
CPC ............. *H04L 5/0051* (2013.01); *H04W 4/06* (2013.01); *H04W 72/0446* (2013.01)

(58) Field of Classification Search
CPC .... H04W 72/30; H04W 72/20; H04L 1/1614; H04L 1/1642; H04L 5/0051; H04L 27/26025; H04L 5/0048; H04L 27/261; H04L 5/001; H04L 5/0094; H04L 5/0007
See application file for complete search history.

(56) References Cited

U.S. PATENT DOCUMENTS

| | | | | |
|---|---|---|---|---|
| 2016/0353476 | A1* | 12/2016 | Sartori | H04L 5/0092 |
| 2018/0092106 | A1* | 3/2018 | Rico Alvarino | H04W 72/1205 |
| 2018/0192255 | A1* | 7/2018 | Guo | H04W 72/30 |
| 2019/0104549 | A1* | 4/2019 | Deng | H04W 52/365 |
| 2019/0306852 | A1* | 10/2019 | Nayeb Nazar | H04L 5/0055 |
| 2020/0059321 | A1* | 2/2020 | Koorapaty | H04L 1/0028 |
| 2020/0146063 | A1* | 5/2020 | Xu | H04L 5/0048 |
| 2022/0039099 | A1* | 2/2022 | Faxér | H04W 72/542 |

OTHER PUBLICATIONS

Alepuz et al., "LTE-Advanced Pro Broadcast Radio Access Network Benchmark", grant No. 761498, 5G-Xcast_D3.1_v1.1 public available Nov. 30, 2017 (Year: 2017).*
International Search Report and Written Opinion—PCT/US2020/033137—ISA/EPO—dated Aug. 10, 2020.
QUALCOMM Incorporated:"Open Issues on System Information for FeMBMS", 3GPP TSG-RAN2 Meeting #96, 3GPP Draft; R2-168832 FEMBMS Remaining Issues, 3rd Generation Partnership Project (3GPP), Mobile Competence Centre ; 650, Route Des Lucioles ; F-06921 Sophia-Antipolis Cedex; France, vol. RAN WG2, No. Reno, NV, USA; Nov. 14, 2016-Nov. 18, 2016, Nov. 14, 2016 (Nov. 14, 2016), 3 Pages, XP051178400, Retrieved from the Internet: URL: http://www.3gpp.org/ftp/Meetings_3GPP_SYNC/RAN2/Docs/ [retrieved on Nov. 14, 2016].

* cited by examiner

Reference Signal 510

MCCH 505

BROADCAST CONTROL CHANNEL DECODING IN DEDICATED CARRIER

CROSS REFERENCE

The present application for patent claims the benefit of U.S. Provisional Patent Application No. 62/849,777 by CATOVIC et al., entitled "BROADCAST CONTROL CHANNEL DECODING IN DEDICATED CARRIER," filed May 17, 2019, assigned to the assignee hereof, and expressly incorporated by reference herein.

BACKGROUND

The following relates generally to wireless communications, and more specifically to broadcast control channel decoding (such as a multicast control channel (MCCH) in a dedicated carrier.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

One or more user equipments (UE) may receive broadcast or multicast signals from a base station via a dedicated carrier. In particular, a broadcast control channel (e.g., an MCCH) may be received when a UE is in communication with a broadcast or multicast network. The broadcast control channel may typically be decoded based on channel estimation procedures. The channel estimation procedures may be based on measurements made of reference signals. Current methods for determining which reference signals to use for channel estimation of a broadcast control channel may be insufficient.

SUMMARY

The described techniques relate to improved methods, systems, devices, and apparatuses that support broadcast control channel decoding in a dedicated carrier. Generally, a user equipment (UE) may determine the reference signals that are available to be used for channel estimation of a received broadcast control channel (for example, a multicast control channel (MCCH)). The reference signals determined as available for channel estimation of the broadcast control channel have the same numerology as the broadcast control channel. In some instances, a UE may receive a broadcast control channel and reference signals for performing channel estimation in relation to decoding of the broadcast control channel in subframes that are designated as having the same numerology. The numerology used for the broadcast control channel may result in single-symbol subframes, meaning that reference signals used for channel estimation of the broadcast control channel are located in different subframes or subcarriers than the broadcast control channel. In some examples, a base station may indicate in system information, or a UE may determine based on system information, which reference signal resources may be used for channel estimation for a given broadcast control channel. In some examples, a base station may configure and transmit reference signals having the same numerology as a broadcast control channel according to a first reference signal pattern during the same subframe in which the broadcast control channel is configured. The first reference signal pattern may be more dense than a second reference signal pattern used for reference signals having a different numerology than the broadcast control channel. The more dense first reference signal pattern may provide sufficient reference signals for successful single-symbol channel estimation, resulting in a successful decoding of the broadcast control channel.

A method of wireless communications at a UE is described. The method may include identifying that the UE is in communication with a broadcast network via a dedicated carrier in accordance with a first numerology, receiving system information from the network, identifying, based on the system information, a first subframe allocated for reception of a broadcast control channel and at least one or more reference signals, identifying one or more additional subframes, different from the first subframe, as having the first numerology, receiving the one or more reference signals during the first subframe and during the one or more additional subframes, and decoding the broadcast control channel based on the one or more reference signals.

An apparatus for wireless communications at a UE is described. The apparatus may include a processor, memory coupled with the processor, and instructions stored in the memory. The instructions may be executable by the processor to cause the apparatus to identify that the UE is in communication with a broadcast network via a dedicated carrier in accordance with a first numerology, receive system information from the network, identify, based on the system information, a first subframe allocated for reception of a broadcast control channel and at least one or more reference signals, identify one or more additional subframes, different from the first subframe, as having the first numerology, receive the one or more reference signals during the first subframe and during the one or more additional subframes, and decode the broadcast control channel based on the one or more reference signals.

Another apparatus for wireless communications at a UE is described. The apparatus may include means for identifying that the UE is in communication with a broadcast network via a dedicated carrier in accordance with a first numerology, receiving system information from the network, identifying, based on the system information, a first subframe allocated for reception of a broadcast control channel and at least one or more reference signals, identifying one or more additional subframes, different from the first subframe, as having the first numerology, receiving the one or more reference signals during the first subframe and during the one or more additional subframes, and decoding the broadcast control channel based on the one or more reference signals.

A non-transitory computer-readable medium storing code for wireless communications at a UE is described. The code may include instructions executable by a processor to identify that the UE is in communication with a broadcast network via a dedicated carrier in accordance with a first numerology, receive system information from the network, identify, based on the system information, a first subframe allocated for reception of a broadcast control channel and at least one or more reference signals, identify one or more additional subframes, different from the first subframe, as having the first numerology, receive the one or more reference signals during the first subframe and during the one or more additional subframes, and decode the broadcast control channel based on the one or more reference signals.

In some examples of the method, apparatuses, and non-transitory computer-readable medium described herein, the first subframe and the one or more additional subframes may be each one-symbol subframes as a result of using the first numerology.

Some examples of the method, apparatuses, and non-transitory computer-readable medium described herein may further include operations, features, means, or instructions for identifying a numerology indicator in the system information, and determining, based on the numerology indicator, that each of the one or more additional subframes may have the first numerology.

In some examples of the method, apparatuses, and non-transitory computer-readable medium described herein, the numerology indicator includes one bit.

In some examples of the method, apparatuses, and non-transitory computer-readable medium described herein, the system information further indicates that the one or more additional subframes may be allocated for reception of the at least one or more reference signals.

Some examples of the method, apparatuses, and non-transitory computer-readable medium described herein may further include operations, features, means, or instructions for receiving a subframe allocation indicator in the system information, and determining the one or more additional subframes from the subframe allocation indicator.

In some examples of the method, apparatuses, and non-transitory computer-readable medium described herein, the subframe allocation indicator includes a set of bits or a bitmap.

In some examples of the method, apparatuses, and non-transitory computer-readable medium described herein, identifying the one or more additional subframes may include operations, features, means, or instructions for determining that the one or more additional subframes may have the first numerology based on a predetermined relationship between the first subframe and the one or more additional subframes.

Some examples of the method, apparatuses, and non-transitory computer-readable medium described herein may further include operations, features, means, or instructions for identifying, based on the system information, an adjacent subframe to the first subframe, the adjacent subframe including the one or more additional subframes, where identifying the one or more additional subframes may be based on the identifying the adjacent subframe.

In some examples of the method, apparatuses, and non-transitory computer-readable medium described herein, the one or more additional subframes having the first numerology includes at least two subframes.

Some examples of the method, apparatuses, and non-transitory computer-readable medium described herein may further include operations, features, means, or instructions for receiving a periodic cell acquisition subframe, and identifying that the first subframe and the one or more additional subframes may be within a same period of the cell acquisition subframe such that the first subframe and the one or more additional subframes may be within a same multi-cast-broadcast single-frequency network (MBSFN) area.

In some examples of the method, apparatuses, and non-transitory computer-readable medium described herein, each subframe within the same period of the cell acquisition subframe, but not including the cell acquisition subframe, may have the first numerology.

In some examples of the method, apparatuses, and non-transitory computer-readable medium described herein, the broadcast control channel may be an MCCH.

In some examples of the method, apparatuses, and non-transitory computer-readable medium described herein, the first subframe and the one or more additional subframes are within a same multi-cast-broadcast single-frequency network (MBSFN).

A method of wireless communications at a UE is described. The method may include identifying that the UE is in communication with a broadcast network via a dedicated carrier in accordance with a first numerology, receiving system information from the network, identifying, based on the system information, a first subframe allocated for reception of a broadcast control channel within a first subset of subcarriers of the first subframe, identifying one or more additional subcarriers of the first subframe different from the first subset of subcarriers, as being allocated for reception of at least one or more reference signals, receiving the one or more reference signals during only the first subframe, and decoding the broadcast control channel based on the one or more reference signals.

An apparatus for wireless communications at a UE is described. The apparatus may include a processor, memory coupled with the processor, and instructions stored in the memory. The instructions may be executable by the processor to cause the apparatus to identify that the UE is in communication with a broadcast network via a dedicated carrier in accordance with a first numerology, receive system information from the network, identify, based on the system information, a first subframe allocated for reception of a broadcast control channel within a first subset of subcarriers of the first subframe, identify one or more additional subcarriers of the first subframe different from the first subset of subcarriers, as being allocated for reception of at least one or more reference signals, receive the one or more reference signals during only the first subframe, and decode the broadcast control channel based on the one or more reference signals.

Another apparatus for wireless communications at a UE is described. The apparatus may include means for identifying that the UE is in communication with a broadcast network via a dedicated carrier in accordance with a first numerology, receiving system information from the network, identifying, based on the system information, a first subframe allocated for reception of a broadcast control channel within a first subset of subcarriers of the first subframe, identifying one or more additional subcarriers of the first subframe different from the first subset of subcarriers, as being allocated for reception of at least one or more reference signals, receiving the one or more reference signals during only the first subframe, and decoding the broadcast control channel based on the one or more reference signals.

A non-transitory computer-readable medium storing code for wireless communications at a UE is described. The code may include instructions executable by a processor to identify that the UE is in communication with a broadcast network via a dedicated carrier in accordance with a first numerology, receive system information from the network, identify, based on the system information, a first subframe allocated for reception of a broadcast control channel within a first subset of subcarriers of the first subframe, identify one or more additional subcarriers of the first subframe different from the first subset of subcarriers, as being allocated for reception of at least one or more reference signals, receive the one or more reference signals during only the first subframe, and decode the broadcast control channel based on the one or more reference signals.

In some examples of the method, apparatuses, and non-transitory computer-readable medium described herein, the first subframe may be a one-symbol subframe as a result of using the first numerology.

Some examples of the method, apparatuses, and non-transitory computer-readable medium described herein may further include operations, features, means, or instructions for identifying, based on the system information, that a first reference signal pattern within the one or more additional subcarriers of the subframe may be different than a second reference signal pattern for one or more additional subframes different from the first subframe.

In some examples of the method, apparatuses, and non-transitory computer-readable medium described herein, a reference signal density of the first reference signal pattern may be more dense in a frequency domain than a reference signal density of the second reference signal pattern.

In some examples of the method, apparatuses, and non-transitory computer-readable medium described herein, the one or more subcarriers of the first subframe may have the first numerology and the one or more additional subframes may have a second numerology that may be different than the first numerology.

In some examples of the method, apparatuses, and non-transitory computer-readable medium described herein, the broadcast control channel may be a MCCH.

A method of wireless communications at a base station is described. The method may include identifying that the base station is operating within a broadcast network and in communication with one or more UEs via a dedicated carrier in accordance with a first numerology, allocating a first subframe for transmission of a broadcast control channel and at least one or more reference signals, allocating one or more additional subframes, different from the first subframe and having the first numerology, for transmission of the at least one or more reference signals, transmitting system information indicating that the first subframe and the one or more additional subframes each use the first numerology, transmitting the at least one or more reference signals over the first subframe and the one or more additional subframes, and transmitting the broadcast control channel over the first subframe.

An apparatus for wireless communications at a base station is described. The apparatus may include a processor, memory coupled with the processor, and instructions stored in the memory. The instructions may be executable by the processor to cause the apparatus to identify that the base station is operating within a broadcast network and in communication with one or more UEs via a dedicated carrier in accordance with a first numerology, allocate a first subframe for transmission of a broadcast control channel and at least one or more reference signals, allocate one or more additional subframes, different from the first subframe and having the first numerology, for transmission of the at least one or more reference signals, transmit system information indicating that the first subframe and the one or more additional subframes each use the first numerology, transmit the at least one or more reference signals over the first subframe and the one or more additional subframes, and transmit the broadcast control channel over the first subframe.

Another apparatus for wireless communications at a base station is described. The apparatus may include means for identifying that the base station is operating within a broadcast network and in communication with one or more UEs via a dedicated carrier in accordance with a first numerology, allocating a first subframe for transmission of a broadcast control channel and at least one or more reference signals, allocating one or more additional subframes, different from the first subframe and having the first numerology, for transmission of the at least one or more reference signals, transmitting system information indicating that the first subframe and the one or more additional subframes each use the first numerology, transmitting the at least one or more reference signals over the first subframe and the one or more additional subframes, and transmitting the broadcast control channel over the first subframe.

A non-transitory computer-readable medium storing code for wireless communications at a base station is described. The code may include instructions executable by a processor to identify that the base station is operating within a broadcast network and in communication with one or more UEs via a dedicated carrier in accordance with a first numerology, allocate a first subframe for transmission of a broadcast control channel and at least one or more reference signals, allocate one or more additional subframes, different from the first subframe and having the first numerology, for transmission of the at least one or more reference signals, transmit system information indicating that the first subframe and the one or more additional subframes each use the first numerology, transmit the at least one or more reference signals over the first subframe and the one or more additional subframes, and transmit the broadcast control channel over the first subframe.

In some examples of the method, apparatuses, and non-transitory computer-readable medium described herein, the first subframe and the one or more additional subframes may be each one-symbol subframes as a result of using the first numerology.

In some examples of the method, apparatuses, and non-transitory computer-readable medium described herein, transmitting the system information further may include operations, features, means, or instructions for transmitting, in the system information, a numerology indicator that indicates that each of the one or more additional subframes may have the first numerology.

In some examples of the method, apparatuses, and non-transitory computer-readable medium described herein, the numerology indicator includes one bit.

In some examples of the method, apparatuses, and non-transitory computer-readable medium described herein, the system information further indicates that the one or more additional subframes may be allocated for reception of the at least one or more reference signals.

In some examples of the method, apparatuses, and non-transitory computer-readable medium described herein, transmitting the system information further may include operations, features, means, or instructions for transmitting, in the system information, a subframe allocation indicator that indicates the one or more additional subframes.

In some examples of the method, apparatuses, and non-transitory computer-readable medium described herein, the subframe allocation indicator includes a set of bits or a bitmap.

Some examples of the method, apparatuses, and non-transitory computer-readable medium described herein may further include operations, features, means, or instructions for identifying a predetermined relationship between the first subframe and the one or more additional subframes, where allocating the first subframe and allocating the one or more additional subframes may be based on the predetermined relationship.

Some examples of the method, apparatuses, and non-transitory computer-readable medium described herein may further include operations, features, means, or instructions for identifying an adjacent subframe to the first subframe, where allocating the one or more additional subframes further includes allocating the one or more additional subframes in the adjacent subframe.

In some examples of the method, apparatuses, and non-transitory computer-readable medium described herein, the one or more additional subframes having the first numerology includes at least two subframes.

Some examples of the method, apparatuses, and non-transitory computer-readable medium described herein may further include operations, features, means, or instructions for transmitting a periodic cell acquisition subframe, and allocating the first subframe and the one or more additional subframes within a same period of the cell acquisition subframe such that the first subframe and the one or more additional subframes may be within a same MBSFN area.

In some examples of the method, apparatuses, and non-transitory computer-readable medium described herein, each subframe within the same period of the cell acquisition subframe, but not including the cell acquisition subframe, may have the first numerology.

In some examples of the method, apparatuses, and non-transitory computer-readable medium described herein, the broadcast control channel may be a MCCH.

A method of wireless communications at a base station is described. The method may include identifying that the base station is operating within a broadcast network and in communication with one or more UEs via a dedicated carrier in accordance with a first numerology, allocating a first subframe for transmission of a broadcast control channel within a first subset of subcarriers of the first subframe, allocating one or more additional subcarriers of the first subframe different from the first subset of subcarriers, for transmission of at least one or more reference signals, transmitting system information indicating the first subset of subcarriers of the first subframe and the one or more additional subcarriers of the first subframe, transmitting the at least one or more reference signals over only the one or more additional subcarriers during the first subframe, and transmitting the broadcast control channel over the first subset of subcarriers of the first subframe.

An apparatus for wireless communications at a base station is described. The apparatus may include a processor, memory coupled with the processor, and instructions stored in the memory. The instructions may be executable by the processor to cause the apparatus to identify that the base station is operating within a broadcast network and in communication with one or more UEs via a dedicated carrier in accordance with a first numerology, allocate a first subframe for transmission of a broadcast control channel within a first subset of subcarriers of the first subframe, allocate one or more additional subcarriers of the first subframe different from the first subset of subcarriers, for transmission of at least one or more reference signals, transmit system information indicating the first subset of subcarriers of the first subframe and the one or more additional subcarriers of the first subframe, transmit the at least one or more reference signals over only the one or more additional subcarriers during the first subframe, and transmit the broadcast control channel over the first subset of subcarriers of the first subframe.

Another apparatus for wireless communications at a base station is described. The apparatus may include means for identifying that the base station is operating within a broadcast network and in communication with one or more UEs via a dedicated carrier in accordance with a first numerology, allocating a first subframe for transmission of a broadcast control channel within a first subset of subcarriers of the first subframe, allocating one or more additional subcarriers of the first subframe different from the first subset of subcarriers, for transmission of at least one or more reference signals, transmitting system information indicating the first subset of subcarriers of the first subframe and the one or more additional subcarriers of the first subframe, transmitting the at least one or more reference signals over only the one or more additional subcarriers during the first subframe, and transmitting the broadcast control channel over the first subset of subcarriers of the first subframe.

A non-transitory computer-readable medium storing code for wireless communications at a base station is described. The code may include instructions executable by a processor to identify that the base station is operating within a broadcast network and in communication with one or more UEs via a dedicated carrier in accordance with a first numerology, allocate a first subframe for transmission of a broadcast control channel within a first subset of subcarriers of the first subframe, allocate one or more additional subcarriers of the first subframe different from the first subset of subcarriers, for transmission of at least one or more reference signals, transmit system information indicating the first subset of subcarriers of the first subframe and the one or more additional subcarriers of the first subframe, transmit the at least one or more reference signals over only the one or more additional subcarriers during the first subframe, and transmit the broadcast control channel over the first subset of subcarriers of the first subframe.

In some examples of the method, apparatuses, and non-transitory computer-readable medium described herein, the first subframe may be a one-symbol subframe as a result of using the first numerology.

Some examples of the method, apparatuses, and non-transitory computer-readable medium described herein may further include operations, features, means, or instructions for transmitting, in the system information, an indication of a first reference signal pattern within the one or more additional subcarriers of the subframe that may be different than a second reference signal pattern for one or more additional subframes different from the first subframe.

In some examples of the method, apparatuses, and non-transitory computer-readable medium described herein, a reference signal density of the first reference signal pattern may be more dense in a frequency domain than a reference signal density of the second reference signal pattern.

In some examples of the method, apparatuses, and non-transitory computer-readable medium described herein, the one or more subcarriers of the first subframe may have the first numerology and the one or more additional subframes may have a second numerology that may be different than the first numerology.

In some examples of the method, apparatuses, and non-transitory computer-readable medium described herein, the broadcast control channel may be a MCCH.

DETAILED DESCRIPTION

Figure 1:
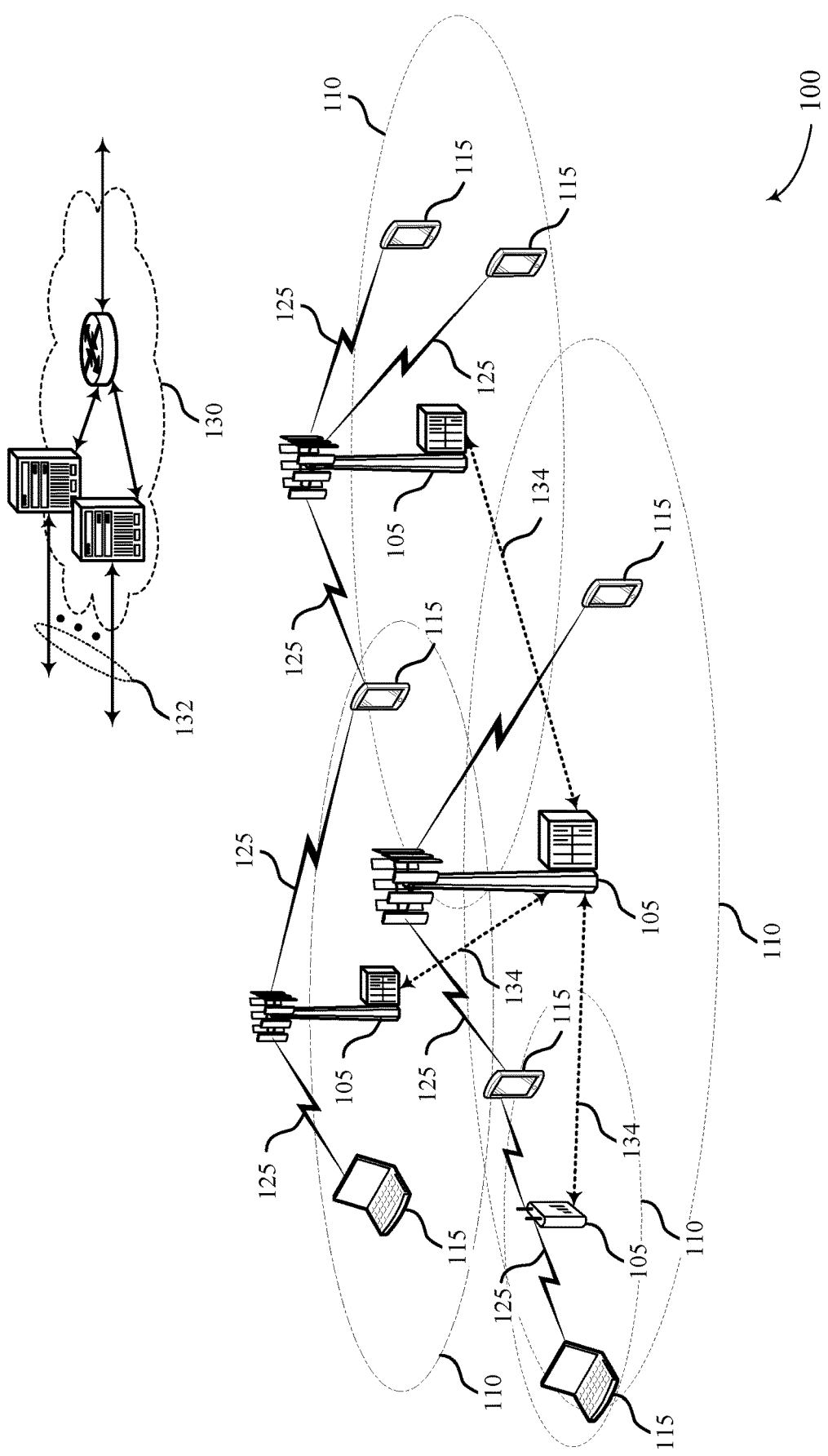
FIG. 1 illustrates an example of a system for wireless communications that supports broadcast control channel decoding in a dedicated carrier in accordance with aspects of the present disclosure.

In some examples of a wireless communications system, a broadcast network (e.g., a multicast-broadcast single-frequency network (MBSFN)) may communicate with one or more user equipments (UEs) via a dedicated carrier (e.g., a frequency carrier that supports only broadcast transmission and does not support unicast transmission). The one or more UEs may be located in a geographic area corresponding to the MBSFN. The MBSFN area may correspond to a particular numerology. Thus, a base station may send broadcast or multicast messages to the UEs using a given numerology. In some examples, the numerology may result in the use of one-symbol subframes.

In some examples, a UE may be located in overlapping MBSFN areas. Because each MBSFN area may correspond to a different numerology, the UE may be capable of receiving signals having different numerologies.

In some examples, a base station may transmit system information, including configuration information for a broadcast control channel (e.g., a multicast control channel (MCCH)) corresponding to an MBSFN area. The broadcast control channel may be used to schedule multimedia broadcast/multicast service (MBMS) transmissions. The base station may also transmit one or more reference signals, which may be used for channel estimation. A UE may perform channel estimation for the MCCH based on reference signals having the same numerology as the MCCH. However, in some examples, a UE 115 may be capable of receiving reference signals having different numerologies (e.g., corresponding to different overlapping MBSFN areas). In such examples, if a UE performs channel estimation based on reference signals having a different numerology, the UE may fail to successfully decode the MCCH.

In some examples, a UE may assume that all reference signals of a radio frame have the same numerology as a configured MCCH, which may result in failed MCCH decoding. For instance, a UE may receive a transmission from a base station using a numerology with a one-symbol subframe, providing limited reference signal resources for channel estimation. In some examples, a UE may wrongly assume that all subframes within dedicated MBSFN subframes of a dedicated carrier correspond to the same numerology, and may thus wrongly assume that any reference signal transmitted during the dedicated MBSFN subframes of the dedicated carrier are available for channel estimation. However, in some cases, two or more MBSFNs may coordinate to transmit different reference signals having different numerologies. This may result in a UE in overlapping MBSFN areas receiving multiple reference signals having different numerologies during a single set of dedicated MBSFN subframes. If the UE wrongly assumes that any reference signal transmitted during the dedicated MBSFN subframes of the dedicated multicast broadcast/multicast service (MBMS) carrier have the same numerology, then measured reference signals may result in an unresolved channel, and failed decoding of the MCCH. In some examples, a UE may wrongly assume that one MBSFN area will always be allocated subframes in pairs (e.g., so the UE may perform cross-subframe channel estimation using a subframe allocated for MCCH and an adjacent subframe). However, as different MBSFNs coordinate, this assumption may not be correct.

To increase the likelihood of successful channel estimation and MCCH decoding, a base station and a UE may coordinate to that the UE uses reference signals that have the same numerology as a received broadcast control channel (such as an MCCH). In some examples, the base station and UE may both follow predefined rules that define that subframes near an MCCH subframe use the same numerology as the MCCH subframe. In other examples, a base station may indicate in system information, or a UE may determine based on system information, which reference signal resources may be used for channel estimation for a given MCCH. In some examples, a base station may configure and transmit reference signals having the same numerology as an MCCH according to a first reference signal pattern during the same subframe in which the MCCH is configured. The first reference signal pattern may be more dense than a second reference signal pattern used for reference signals having a different numerology than the MCCH. The more dense first reference signal pattern may provide sufficient reference signals for successful single-symbol channel estimation, resulting in a successful MCCH decoding.

Particular aspects of the subject matter described herein may be implemented to realize one or more advantages. The described techniques may support improvements that may result in saved overhead at the base station, decreased power consumption during receiving and decoding at a UE, improved system efficiency, increased battery life, and improved user experience. As such, supported techniques may include improved network operations and, in some examples, may promote device and network efficiencies, among other benefits.

Aspects of the disclosure are initially described in the context of a wireless communications system. Aspects of the disclosure are further illustrated by and described with reference to dedicated carriers, resource allocations, and process flows. Aspects of the disclosure are further illustrated by and described with reference to apparatus diagrams, system diagrams, and flowcharts that relate to broadcast control channel decoding in a dedicated carrier.

FIG. 1 illustrates an example of a wireless communications system 100 that supports broadcast control channel decoding in a dedicated carrier in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some examples, a base station 105 may indicate in system information, or a UE 115 may determine based on system information or based on predefined rules, which reference signal resources may be used for channel estimation for a given MCCH. In some examples, a base station 105 may configure and transmit reference signals having the same numerology as an MCCH according to a first reference signal pattern during the same subframe in which the MCCH is configured. The first reference signal pattern may be more dense than a second reference signal pattern used for reference signals having a different numerology than the MCCH. The more dense first reference signal pattern may provide sufficient reference signals for successful single-symbol channel estimation, resulting in a successful MCCH decoding.

Figure 2:
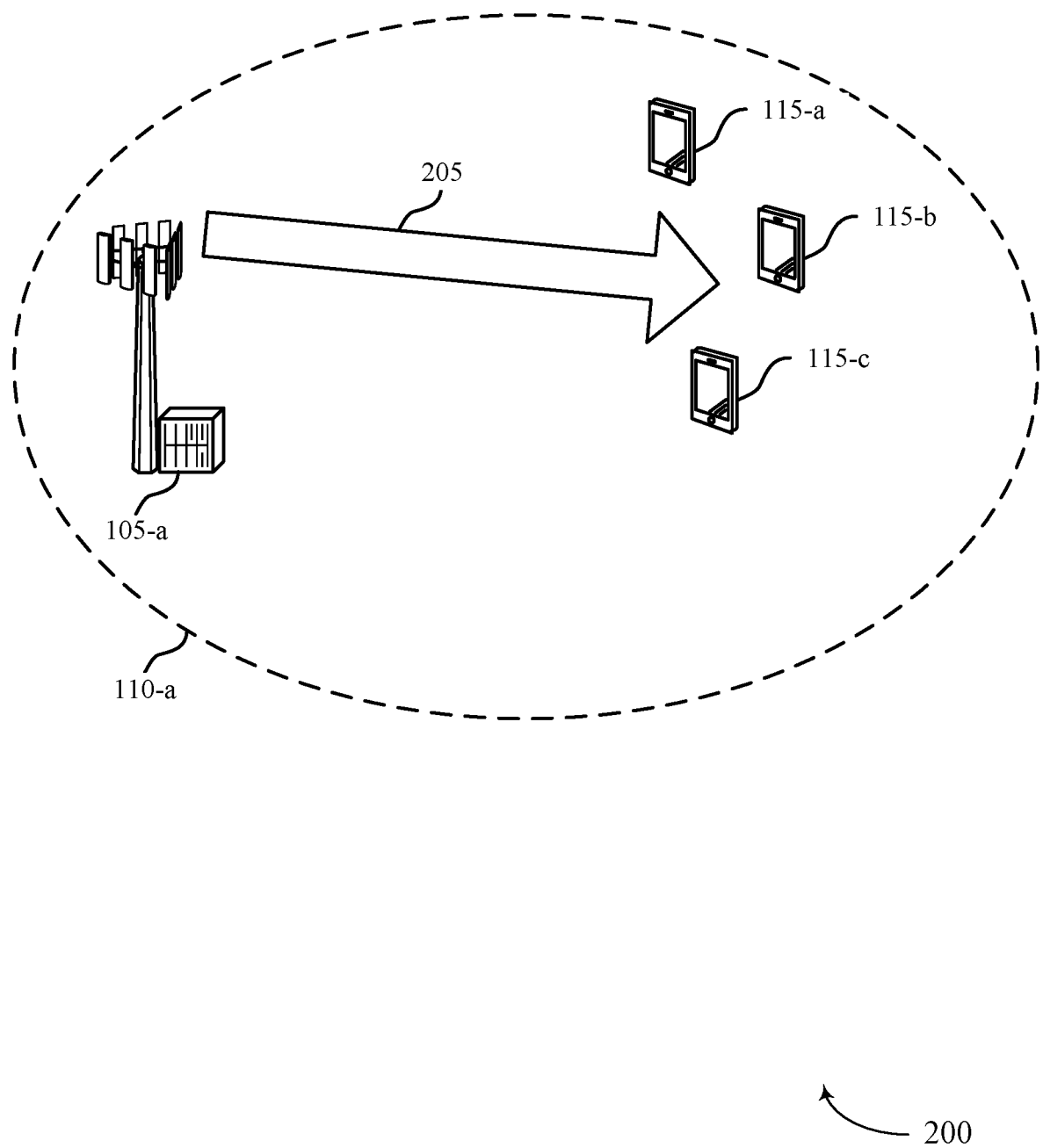
FIG. 2 illustrates an example of a wireless communications system that supports broadcast control channel decoding in a dedicated carrier in accordance with aspects of the present disclosure.

FIG. 2 illustrates an example of a wireless communications system 200 that supports broadcast control channel decoding in a dedicated carrier in accordance with aspects of the present disclosure. In some examples, wireless communications system 200 may implement aspects of wireless communications system 100.

In some examples of a wireless communications system, a base station 105-a may communicate with one or more UEs 115 (e.g., UE 115-a, UE 115-b, and UE 115-c). In some examples, the one or more UEs 115 may be in communication with a broadcast network (e.g., an MBSFN). UE 115-a, UE 115-b, and UE 115-c may be located in a same or similar geographic area. The geographic area in which the UEs 115 are located may correspond to a first MBSFN. UEs 115 in the same MBSFN geographic area may monitor for and receive broadcast information from that MBSFN. In some examples, base station 105-a may transmit one or more broadcast or multicast signals, such as broadcast message 205. UE 115-a, for example, may monitor for and receive broadcast message 205 on a dedicated broadcast carrier (e.g., without sending any feedback information or other uplink signaling on the dedicated broadcast carrier). In some examples, one or more MBSFN geographic areas may overlap. Thus, a UE 115-a may be capable of receiving broadcast message 205 from a first MBSFN, and may be capable of receiving additional broadcast messages from a second MBSFN.

In some examples, a MBSFN area may correspond to a particular numerology. An MBSFN may transmit control signaling (e.g., an MCCH) having the particular numerology. Different MBSFNs may configure and transmit MCCHs using different numerologies. Similarly, different MBSFNs may transmit reference signals which may be used by UEs 115 to decode MCCHs if they have the same numerology as the MCCHs. Thus, base station 105-a may send a broadcast message 205 including one or more reference signals having the same numerology as a configured MCCH. UE 115-a may identify one or more reference signals, perform measurements on the reference signals, and may perform channel estimation based thereon. However, UE 115-a may also be able to receive one or more reference signals from another MBSFN, which may have different numerologies than an MCCH configured by base station 105-a.

In some examples of a wireless communications system (e.g., an LTE system) reference signals and MCCHs may be transmitted according to a numerology where symbol durations are less than subframe durations. In such examples, reference signal symbols may be staggered in the frequency domain with multiple occurrences per subframe in the time domain, as described in greater detail with respect to FIG. 4. However, in other examples of a wireless communications system (e.g., an NR system), a base station 105-a may transmit reference signals and MCCHs according to a numerology where a symbol duration is equal to a subframe duration. In such examples, a reference signal symbol may fill an entire subframe. In such examples, a UE 115-a may receive and measure reference signals across multiple (e.g., 2) subframes, and perform channel estimation based thereon. Upon performing channel measurements, the UE 115-a may successfully decode an MCCH if the MCCH has the same numerology as the received reference signals.

In some examples, a broadcast message 205 may include system information (e.g., a system information block (SIB)). The SIB may indicate a broadcast control channel (e.g., an MCCH) configuration. The broadcast control channel may be used to schedule multimedia broadcast/multicast service (MBMS) transmissions. That is, the SIB may indicate one or more transmission time intervals (TTIs) (e.g., subframes) allocated for MCCH transmission. UE 115-a, for example, may receive and decode the SIB, and may determine resources to monitor for MCCH transmission from the base station based on the SIB. However, in cases where a UE 115-a is capable of receiving multiple MCCHs having different numerologies (e.g., where a UE 115-a is located in overlapping MBSFN areas), the UE 115-a may first identify which subframes include reference signals having the same numerology as a scheduled MCCH, as described in greater detail with respect to FIGS. 5-8.

Figure 3:
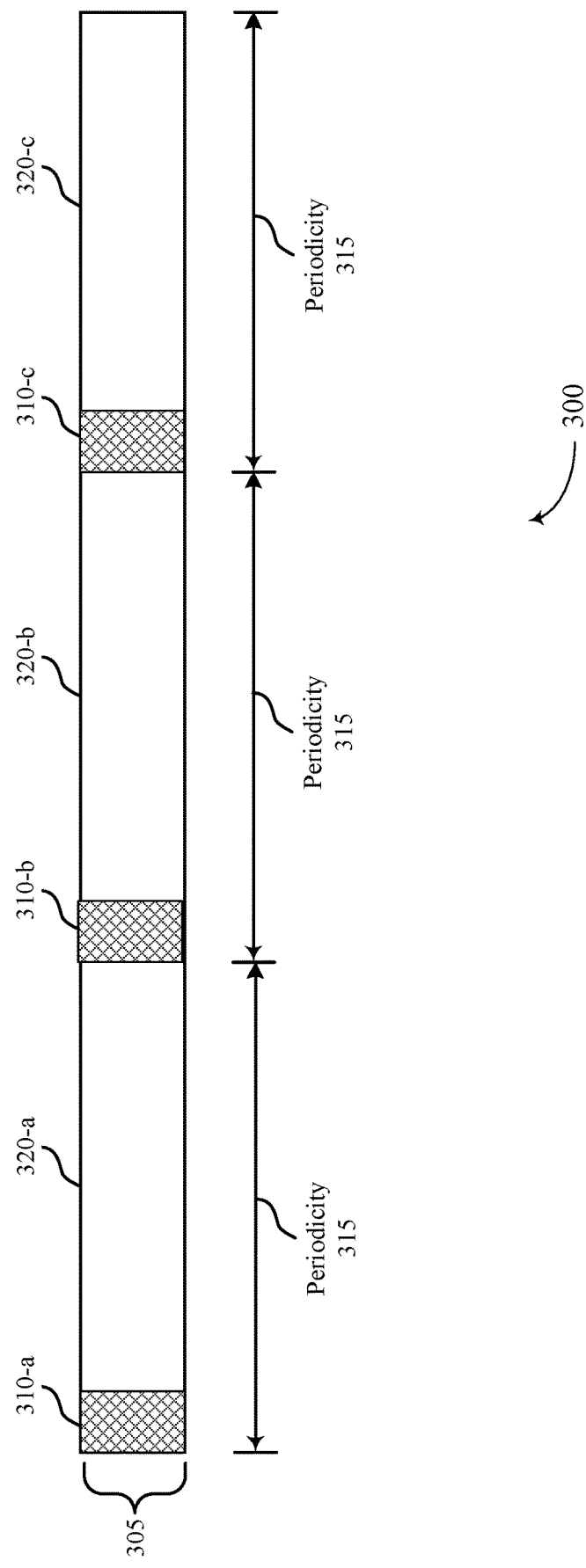
FIG. 3 illustrates an example of a dedicated carrier configuration that supports broadcast control channel decoding in a dedicated carrier in accordance with aspects of the present disclosure.

FIG. 3 illustrates an example of a dedicated carrier 300 that supports broadcast control channel decoding in a dedicated carrier in accordance with aspects of the present disclosure. In some examples, dedicated carrier 300 may implement aspects of wireless communications system 100. In some examples, dedicated carrier 300 may be an example of a frequency carrier that supports only broadcast transmission and does not support unicast transmission.

In some examples of a wireless communications system, a base station 105 may communicate with one or more UEs 115 using one or more numerologies. For instance, downlink resources may be assigned based on a time-frequency resource grid. In the frequency domain, units may be defined as physical resource blocks, consisting of a number of frequency sub-carriers. In the time domain, units may be defined as slots, consisting of a number of symbols. Slots may be grouped into sub-frames, and subframes may be grouped into radio frames. Numerologies for communicating with UEs 115 may be defined based on one or more parameters. Parameters may include sub-carrier spacing, cyclic prefix length, useful symbol length, fast Fourier transfer (FFT) size, a number of symbols per slot, or a number of slots per subframe, or any combination thereof. For MBMS communications, one or more numerologies may be used. MBMS communications may be defined by MBSFN subframes. A subset of downlink subframes in a radio frame may be reserved for MBMS by being configured as MBSFN subframes by higher layer signaling (e.g., radio resource control signaling). Each MBSFN subframe may be divided into a non-MBSFN region and an MBSFN region. Or, a network may communicate with one or more UEs 115 via a dedicated MBMS carrier 305.

In some examples, MBSFN numerologies may include a subcarrier spacing of 15 kHz, 6/7 symbols per slot, 2 slots per subframe, 10 sub-frames per frame, and a sub-frame duration may be 1 ms. Another numerology supported by MBSFN may include a subcarrier spacing of 7.5 kHz, 3 symbols per slot, 2 slots per subframe, 10 subframes per frame, and a sub-frame duration of 1 ms. Another numerology supported by MBSFN may include a subcarrier spacing of 1.25 kHz, 1 symbol per slot, 1 slot per subframe, 10 sub-frames per frame, and a sub-frame duration of 1 ms. Thus, as described with respect to FIG. 2, in the case of a one-symbol per subframe, a UE may not be able to monitor multiple reference signal symbols within a single subframe.

In some examples, a base station 105 may send MBMS signaling via a dedicated MBMS carrier 305. Dedicated MBMS carrier 305 may not include any non-MBSFN regions (e.g., no unicast control region) in any subframes. In some examples, dedicated MBMS carrier 305 may not include any non-MBSFN subframes in the carrier. Thus, the each subframe and the entire carrier may be dedicated to MBMS transmissions, with the exception of one or more periodic cell acquisition subframes (CASs) 310.

Dedicated MBMS carrier 305 may convey general system information and synchronization signals via one or more reserved subframes. For instance, a base station 105 may transmit system information and synchronization signals during one or more periodic CASs 310. CAS 310 may have a periodicity 315. Thus, base station 105 may transmit CAS 310-a, followed by a set of dedicated MBSFN subframes 320-a. Then, according to periodicity 315, base station 105 may transmit another CAS 310-b, followed by a set of dedicated MBSFN subframes 320-b. Similarly, base station 105 may transmit another CAS 310-c followed by dedicated MBSFN subframes 320-c. In some examples, periodicity 315 may be equal to 40 ms. In such examples (e.g., in a numerology using a subcarrier spacing of 15 kHz), subframe durations may be equal to 1 ms. A base station 105 may transmit a CAS 310-a having a duration of 1 ms, and may configure multicast or broadcast transmissions over dedicated MBSFN subframes 320-a for an additional 39 ms during each period. In some examples, each CAS 310 may have a first numerology (e.g., a legacy numerology) and each set of dedicated MBSFN subframes 320 may have a different numerology. In some examples, one or more MBSFNs may send transmissions during dedicated MBSFN subframes 320, using different numerologies.

In some examples, a wireless communications system (e.g., an NR system) may support a numerology with a long symbol duration (e.g., greater than 3 ms). Such numerologies may support large inter-site distances and rooftop receivers. Each symbol in such numerologies may have a duration of, for example, 1 subframe. Other numerologies (e.g., 1 ms subframes and 10 ms subframes) may not be applicable to a dedicated MBMS carrier 305. In some examples, a whole number of symbols (e.g., and one-symbol subframes) may be included in dedicated MBSFN subframes 320 (e.g., having a duration of 39 ms for a 40 ms periodicity 315).

In some examples, a base station 105 may transmit reference signals according to one or more patterns during dedicated MBSFN subframes 320. Patterns may include specific subframes and subcarriers on which UEs 115 may monitor for reference signals. The locations of the reference signal patterns may be predefined, or preconfigured.

A base station may transmit an MCCH during dedicated MBSFN subframes 320-a. In some examples, system information included in a CAS 310 may indicate the location of an MCCH. An MCCH may be a logical channel carrying MBMS-specific signaling. Each MBSFN area may correspond to one MCCH. The MCCH may carry information regarding subframes allocated to an MBSFN area. In some examples, such subframe allocation information may include resources for the transmission of data, multicast traffic channel (MTCH) and signaling subframes, or MCCH resources. MCCH resources may include resources signaling during the SIB. In some examples, each MBSFN area and physical multicast channel (PMCH) may use different numerologies. A PMCH may multiplex MCCHs and MTCHs. Thus, a UE 115 that is capable of receiving signaling from multiple MBSFNs (e.g., is located in overlapping MBSFN areas), may be capable of receiving MCCHs or reference signals having multiple numerologies.

In some examples, a UE 115 may receive a SIB (e.g., in a CAS 310-a) indicating an MBSFN subframe from dedicated MBSFN subframes 320-a in which to receive an MCCH having a first numerology. The UE 115 may also be capable of receiving reference signals corresponding to another MCCH having a second numerology, and thus may be capable of receiving reference signals having the first numerology and reference signals having the second numerology during dedicated MBSFN subframes 320-a. The UE 115 may identify resources on which to receive reference signals during dedicated MBSFN subframes 320-a for decoding the indicated MCCH as described in greater detail with respect to FIGS. 5-8.

Figure 4:
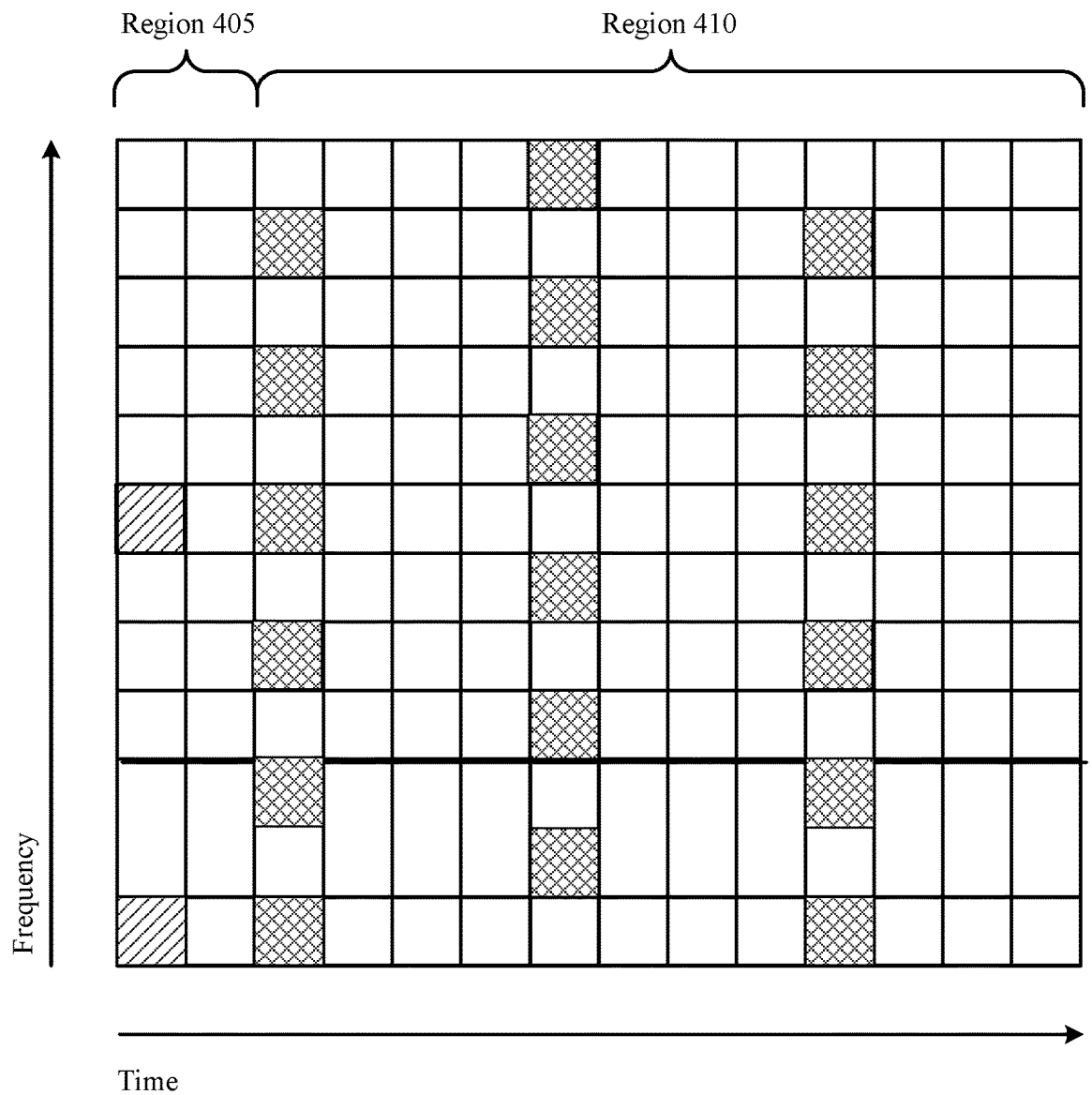
FIG. 4 illustrates an example of a resource allocation that supports broadcast control channel decoding in a dedicated carrier in accordance with aspects of the present disclosure.

FIG. 4 illustrates an example of a resource allocation 400 that supports broadcast control channel decoding in a dedicated carrier in accordance with aspects of the present disclosure. In some examples, resource allocation 400 may implement aspects of wireless communications system 100.

In some examples of wireless communications (as described in greater detail with respect to FIG. 3), a UE 115 may receive one or more MBMS transmissions. The UE 115 may receive system information (e.g., a SIB), and may retrieve an MCCH configuration (e.g., subframes allocated for MCCH transmission) from the SIB. The UE may decode the MCCH and retrieve subframes allocated for PMCHs in the same MBSFN area as the MCCH. That is, each MCCH may be associated with one MBSFN area and one or more PMCHs broadcast in the MBSFN area. Each MCCH and MBSFN area may use a different numerology (e.g., one numerology per each MBSFN area and MCCH associated with the MBSFN).

The UE 115 may decode the MCCH based on channel estimation. Channel estimation may be based on reference signal measurements. Base station 105 may transmit reference signals in subframes allocated to an MBSFN area. For example, a base station 105 may communicate with one or more UEs 115 using a legacy numerology (e.g., a numerology having 14 subframes, each subframe including multiple symbols having a duration less than a subframe duration). In such examples, the base station 105 may transmit reference signals staggered in the frequency domain with multiple occurrences per subframe in the time domain. That is, a first region 405 may be a non-MBSFN region of a carrier. During the non-MBSFN region, the base station 105 may transmit one or more non-MBSFN reference signals according to a first pattern. A second region 410 may be an MBSFN region of a carrier. During the MBSFN region, the base station 105 may transmit one or more MBSFN reference signals according to a second pattern. A UE 115 may determine that an MCCH is scheduled during the MBSFN region. To decode the MCCH, the UE 115 may identify a subframe in which MBSFN reference signals are mapped (e.g., a first subframe of region 410). The UE 115 may receive reference signals across multiple symbols during the single subframe. The UE may thus perform channel estimation across multiple reference signal symbols within the same subframe in both the time and frequency domain. However, such procedures may not be viable options for channel estimation where an MBSFN numerology includes one-symbol subframes. That is, one-symbol per subframe may provide limited reference signal resources for channel estimation.

In some examples, a UE 115 assuming that all reference signals of a radio frame have the same numerology as a configured MCCH may result in failed MCCH decoding. For instance, a UE 115 may receive a transmission from a base station using a numerology with a one-symbol subframe, providing limited reference signal resources for channel estimation. In some examples, a UE 115 may wrongly assume that all subframes within dedicated MBSFN subframes correspond to the same numerology, and may thus wrongly assume that any reference signal transmitted during the dedicated MBSFN subframes of a dedicated MBMS carrier are available for channel estimation. However, in some cases, two or more MBSFNs may coordinate to transmit different reference signals having different numerologies. This may result in a UE 115 in overlapping MBSFN areas receiving multiple reference signals having different numerologies during a single set of dedicated MBSFN subframes on a dedicated MBMS carrier. If the UE 115 wrongly assumes that any reference signal transmitted during the dedicated MBSFN subframes of the dedicated MBMS carrier have the same numerology, then measured reference signals may result in an unresolved channel, and failed decoding of the MCCH. In some examples, a UE 115 may wrongly assume that one MBSFN area will always be allocated subframes in pairs (e.g., so the UE 115 may perform cross-subframe channel estimation using a subframe allocated for MCCH and an adjacent subframe). However, as different MBSFNs coordinate, this assumption may not be correct.

Figure 5:
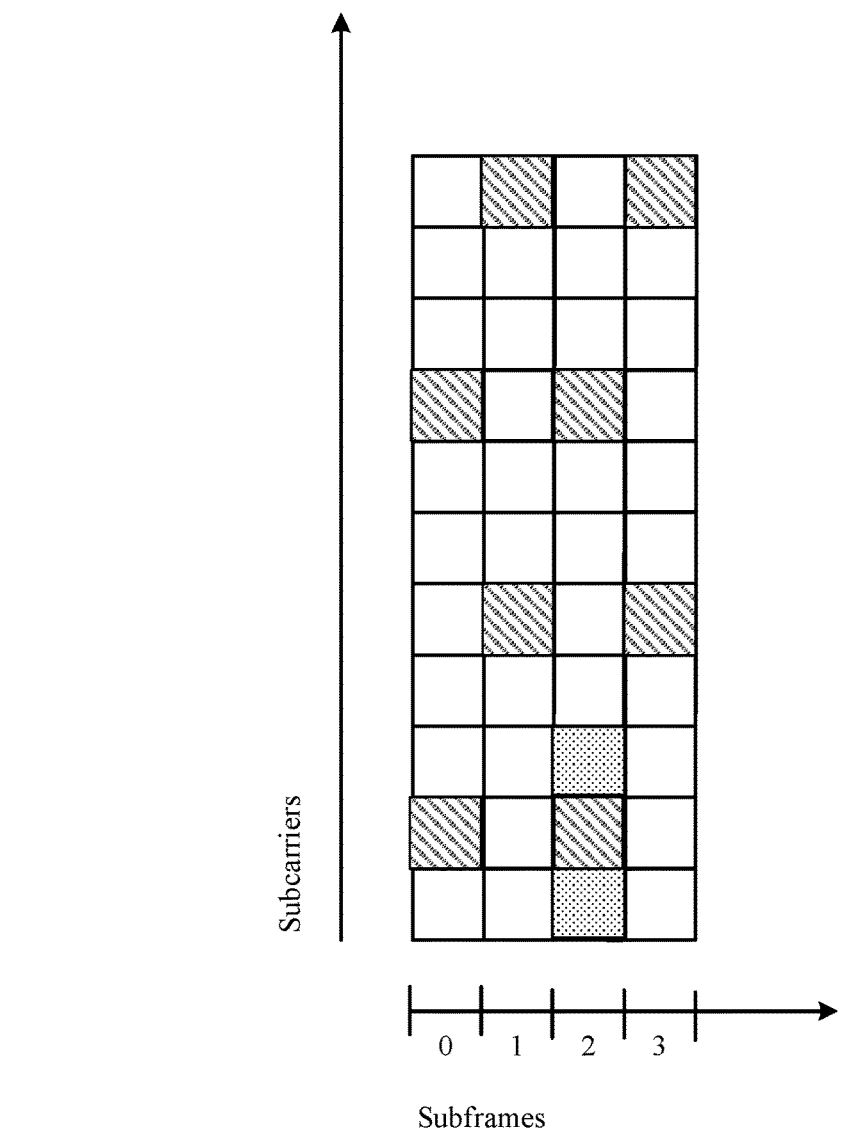
FIG. 5 illustrates an example of a resource allocation that supports broadcast control channel decoding in a dedicated carrier in accordance with aspects of the present disclosure.
Figure 5:
Figure 5:
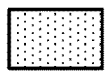
Figure 6:
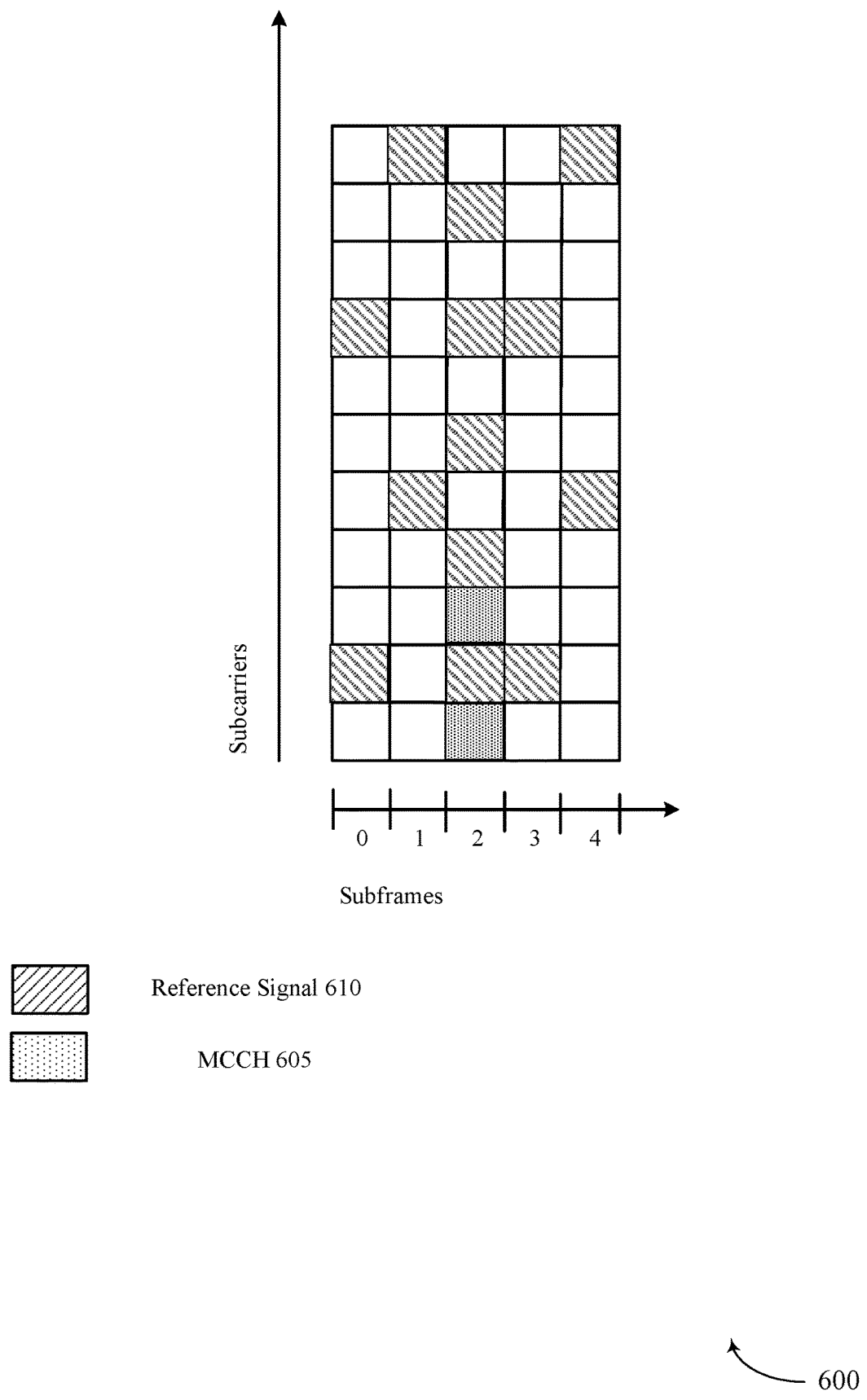
FIG. 6 illustrates an example of a resource allocation that supports broadcast control channel decoding in a dedicated carrier in accordance with aspects of the present disclosure.
Figure 7:
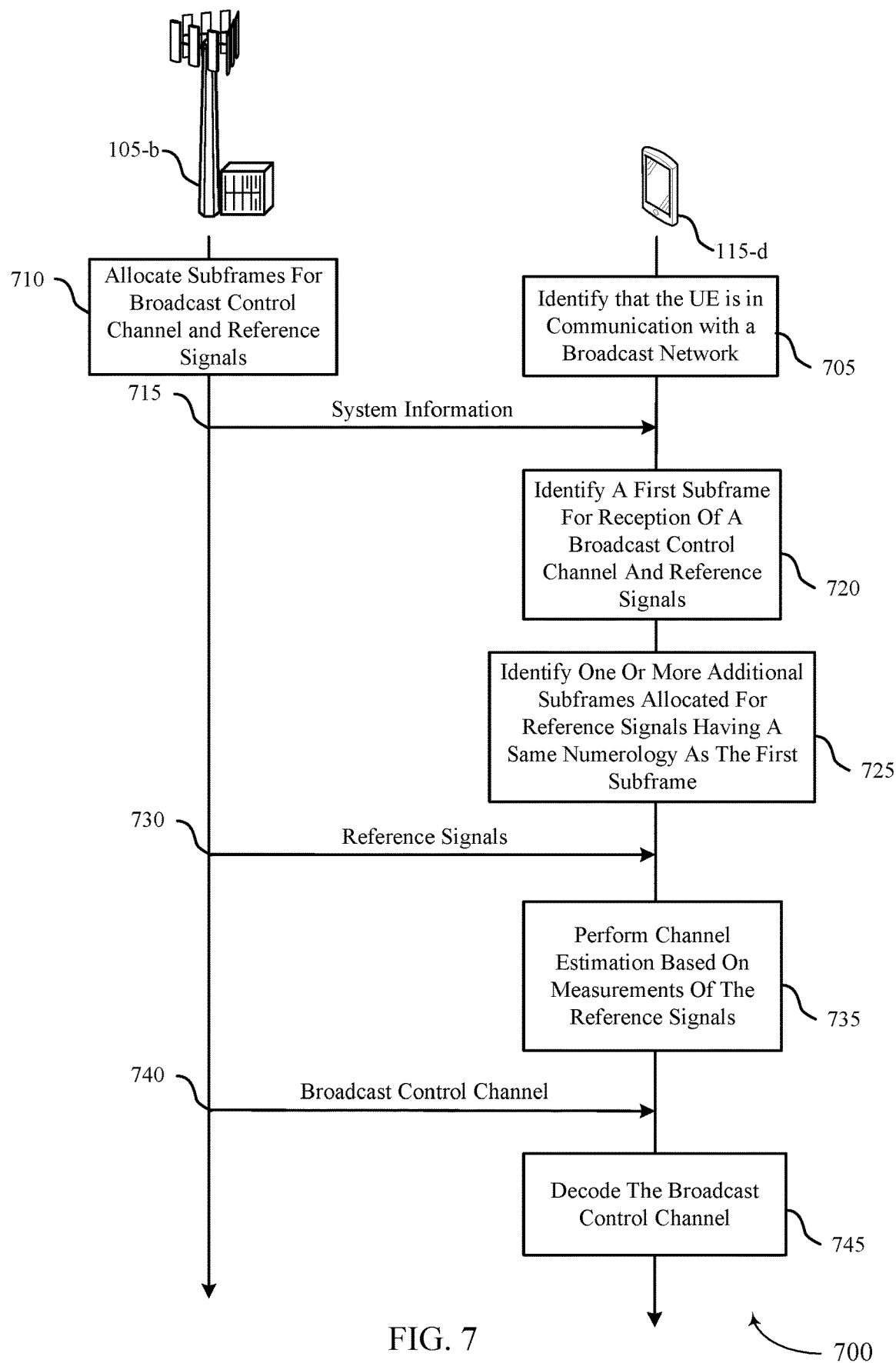
FIG. 7 illustrates an example of a process flow that supports broadcast control channel decoding in a dedicated carrier in accordance with aspects of the present disclosure.

To increase the likelihood of successful channel estimation and MCCH decoding, a base station 105 may indicate in system information, or a UE 115 may determine based on system information, which reference signal resources may be used for channel estimation for a given MCCH, as described in greater detail with respect to FIGS. 5 and 7. In some examples, a base station may configure and transmit reference signals having the same numerology as an MCCH according to a first reference signal pattern during the same subframe in which the MCCH is configured. The first reference signal pattern may be more dense than a second reference signal pattern used for reference signals having a different numerology than the MCCH, as described in greater detail with respect to FIGS. 6 and 8.

FIG. 5 illustrates an example of a resource allocation 500 that supports broadcast control channel decoding in a dedicated carrier in accordance with aspects of the present disclosure. In some examples, resource allocation 500 may implement aspects of wireless communications system 100.

In some examples of a wireless communications system, a UE 115 may identify MCCH resources on which an MCCH will be transmitted (e.g., over a dedicated MBMS carrier). The dedicated MBMS carrier may be a frequency carrier that supports only broadcast transmission and does not support unicast transmission. In such examples, UE 115 may support a first numerology having a one-symbol subframe, and the MCCH may have the first numerology. The UE 115 may need to identify subframes on which reference signals having the same numerology as the MCCH will be transmitted so that the UE 115 can perform channel estimation needed for the decoding of the MCCH. Upon identifying the reference signal resources having the same numerology as the MCCH, the UE 115 may perform cross-subframe channel estimation.

A UE 115 may identify, based on system information, resources over which to receive an MCCH 505. For instance, the UE 115 may receive a SIB from a base station 105, indicating a subset of subcarriers (e.g., two subcarriers) during subframe 2 of a dedicated MBMS carrier. In some examples, the UE 115 may then identify one or more subframes that have the same numerology as the MCCH 505 (e.g., the same numerology as subframe 2). For instance, the SIB may indicate whether all subframes in a radio frame in which the MCCH 505 is configured have the same numerology, the SIB may provide a map of subframe allocation for an MBSFN area, or the UE 115 may identify a predefined relationship between the subframe in which the MCCH 505 is located and one or more additional subframes. Upon determining which resources carry a reference signal 510 with the same numerology as the MCCH 505, UE 115 may receive one or more reference signals 510 in another subframe (e.g., subframe 0 or subframe 1), receive one or more reference signals 510 in the same subframe as the MCCH 505 (e.g., subframe 2), and may perform cross subframe channel estimation based on the received reference signals 510.

In some examples, a SIB may indicate whether all subframes in a radio frame in which MCCH 505 is configured have the same numerology. For instance, the SIB may include a single-bit numerology indicator (e.g., an indication of the same numerology for all subframes of a radio frame). The numerology indicator may provide an indication that UE 115 may use all subframes in a radio frame in which MCCH 505 is configured for channel estimation. That is, if base station 105 configures any radio frame to include an MCCH 505, then UE 115 may assume that the base station has similarly configured all remaining subframes in the radio frame for PMCHs of the same MBSFN area. In such examples, UE 115 may successfully perform cross-subframe channel estimation using any subframe in the radio frame. For instance, UE 115 may perform cross-subframe channel estimation using reference signals 510 in subframe 1 or subframe 0, in combination with reference signals 510 in subframe 2 for channel estimation, and may decode MCCH 505 based thereon. A single-bit numerology indicator may be simple to implement, and may result in saved overhead at the base station 105 and decreased power consumption during receiving and decoding at a UE 115, resulting in improved system efficiency, increased battery life at a UE 115, and improved user experience.

In some examples, a SIB may provide a map of subframe allocation for an MBSFN area. For instance, MBSFN subframe allocation information may be included in the SIB. The subframe allocation information may be included in a reference signal indicator. Upon decoding the SIB (e.g., including the reference signal indicator), a UE 115 may identify a full picture of subframe allocation for an MBSFN area. The UE 115 may use this full picture to determine which subframes have the first numerology, and which subframes have different numerologies. For instance, if subframe 0 and subframe 2 have the same numerology, and subframe 1 has a different numerology, then UE 115 may determine this subframe allocation based on the reference signal indicator. The UE 115 may then perform cross-subframe channel estimation using reference signals 510 in subframe 0 and reference signals 510 in subframe 2. In some examples, the reference signal indicator may include 3 octets (e.g., 4 octets minus 1 octet). An advantage of including a reference signal indicator in the SIB is that the UE 115 may accurately identify correct reference signals 510 in all scenarios (e.g., regardless of whether multiple MBSFN areas overlap, or reference signals 510 having different numerologies are included in a radio frame or not). The UE 115 will consistently have a clear picture of subframe allocation and numerology, and will therefore consistently avoid wrong assumptions and failed decoding of MCCH 505. Although the SIB may be larger for including a multiple-octet reference signal indicator, this increase in size may have limited effects on the MBMS carrier.

In some examples, a SIB may provide an implicit indication of which subframes have the same numerology as the MCCH. Based on the implicit indication, a UE 115 may identify a predefined relationship between the subframe in which the MCCH 505 is located and one or more additional subframes. For instance, a predefined relationship (e.g., which may be defined in one or more standard) may provide that subframes around an MCCH 505 may be assumed by UE 115 top have reference signals for the same numerology as the MCCH (e.g., and corresponding MBSFN area). For instance, if a period of 39 ms between two CASs has an MCCH 505 with a given numerology, then UE 115 may assume that the same numerology is used in the entire 39 ms between the two CASs.

The predefined relationship may provide that all subframes of a radio frame may be allocated to the same MBSFN area, and that when a base station 105 transmits an MCCH 505 in a radio frame, the base station may also transmit reference signals using the numerology configured for that MBSFN area in the subframes around (e.g., next to, adjacent to, within a threshold number of subframes from, etc.) the MCCH subframe. In some examples, the predefined relationship between the MCCH 505 and additional subframes having the same numerology may provide that any subframe adjacent to (e.g., immediately following or immediately preceding) the subframe in which MCCH 505 is located, may have the same numerology as the subframe in which the MCCH 505 is located. In such examples, where MCCH 505 is configured on subframe 2, UE 115 may assume, based on the predefined relationship, that reference signals 510 in subframe 3 have the same numerology as the reference signals 510 in subframe 2. UE 115 may receive reference signals 510 during subframe 2 and subframe 3, according to a reference signal pattern, and may perform cross-subframe channel estimation based thereon. UE 115 may then successfully decode MCCH 505 based on the cross-subframe channel estimation. In some examples, the predefined relationship between MCCH 505 and additional subframes having the same numerology may provide that all subframes in the same inter-CAS interval may have the same numerology. In such examples, if the period of 39 ms between two CASs has an MCCH 505 with a given numerology, then UE 115 may assume that the same numerology and reference signal pattern is used across the entire 39 ms inter-CAS interval. UE 115 may therefore determine that reference signals 510 in any of subframes 0, 1, and 3 may be used for cross-subframe channel estimation, and may successfully decode the MCCH based on the channel estimation.

In some examples, a UE 115 may perform single-subframe channel estimation using a first reference signal pattern in a subframe on which an MCCH is scheduled, as described in greater detail with respect to FIG. 6.

FIG. 6 illustrates an example of a resource allocation 600 that supports broadcast control channel decoding in a dedicated carrier in accordance with aspects of the present disclosure. In some examples, resource allocation 600 may implement aspects of wireless communications system 100.

In some examples of a wireless communications system, a UE 115 may identify MCCH resources on which an MCCH 605 will be transmitted (e.g., over a dedicated MBMS carrier). The dedicated MBMS carrier may be a frequency carrier that supports only broadcast transmission and does not support unicast transmission. In such examples, UE 115 may support a first numerology having a one-symbol subframe, and the MCCH 605 may have the first numerology. The UE 115 may need to identify subframes on which reference signals 610 having the same numerology as the MCCH 605 will be transmitted so that the UE 115 can perform channel estimation needed for the decoding of the MCCH. Upon identifying the reference signal resources having the same numerology as the MCCH, the UE 115 may perform single-subframe channel estimation.

A UE 115 may identify, based on system information, resources over which to receive an MCCH 605. The base station 105 may transmit the MCCH 605 over the indicated resources (e.g., during subframe 2). UE 115 may identify (e.g., based on a predefined subframe configuration or based on information included in the SIB) subcarriers of subframe 2 on which to receive reference signals 610. Reference signals 610 having the first numerology may not be staggered in the time domain. In order to fully resolve the channel, UE 115 may need to perform measurements on a threshold number of reference signals 610. Thus, base station 105 may transmit reference signals 610 during the MCCH subframe (e.g., subframe 2) according to a first reference signal pattern, and may transmit additional reference signals 610 (e.g., having a different numerology) according to a second reference signal pattern. In some examples, the first reference signal pattern may be more dense than the second reference signal pattern. Based on the more dense first reference signal pattern, UE 115 may successfully perform channel estimation and decode the MCCH 605. In some examples, reference signals 610 having a first reference signal pattern for an MCCH 605 (e.g., in subframe 2) may have a different reference signal pattern than subframes for MTCHs.

Configuring a subframe with an MCCH 605 to include a first, more dense, reference signal pattern may result in decreased impact on MCCH signaling, or SIB signaling. Additionally, a UE 115 may be able to successfully decode an MCCH without performing cross-subframe channel estimation. This may result in decreased overhead at the UE 115, and improved system efficiency. Additionally, signal to noise ratio (SNR) requirements may be decreased, and overall coverage and capacity may be increased, resulting in improved user experience.

FIG. 7 illustrates an example of a process flow 700 that supports broadcast control channel decoding in a dedicated carrier in accordance with aspects of the present disclosure. In some examples, process flow 700 may implement aspects of wireless communications system 100.

At 705, UE 115-*d* may identify that it is in communication with a broadcast network (e.g., an MBSFN). UE 115-*d* may be in communication with the broadcast network via a dedicated carrier in accordance with a first numerology. The dedicated MBMS carrier may be a frequency carrier that supports only broadcast transmission and does not support unicast transmission.

At 710, base station 105-*b* may allocate subframes for a broadcast control channel and reference signals. Base station 105-*b* may allocate a first subframe for transmission of a broadcast control channel (e.g., an MCCH) and may allocate one or more additional subframes, different from the first subframe and having the first numerology, for transmission of the at least one or more reference signals. The broadcast control channel (e.g., the MCCH) may be used to schedule multimedia broadcast/multicast service (MBMS) transmissions.

At 715, base station 105-*b* may transmit system information (e.g., via a SIB) to UE 115-*d*. The system information may include a numerology indicator.

At 720, UE 115-*d* may identify a first subframe for reception of a broadcast control channel (e.g., an MCCH) and one or more reference signals. UE 115-*d* may identify the first subframe, which may be allocated for reception of the broadcast control channel and at least one or more reference signals, based at least in part on the SIB. The first subframe may be a one-symbol subframe as a result of using the first numerology.

In some examples, the SIB transmitted at 715 may include a numerology indicator. In such examples, UE 115-*d* may determine, based on the numerology indicator, that each of the one or more additional subframes has the first numerology. IN some examples, the reference signal indicator may include one bit.

In some examples, the SIB transmitted at 715 may include an indication that one or more additional subframes are allocated for reception of the at least one or more reference signals.

In some examples, the SIB transmitted at 715 may include a subframe allocation indicator. The subframe allocation indicator may provide a mapping of all reference signals for an MBSFN area. In such examples, UE 115-*d* may determine the one or more additional subframes from the subframe allocation indicator. The subframe allocation indicator may include a plurality of bits or a bitmap.

In some examples, UE 115-*d* may determine that the one or more additional subframes have the first numerology based on a predetermined relationship between the first subframe and the one or more additional subframes.

In some examples, the one or more additional subframes having the first numerology may include at least two subframes.

At 725, UE 115-*d* may identify one or more additional subframes allocated for reference signals. UE 115-*d* may identify the one or more additional subframes, which may be different from the first subframe, as having the first numerology. The one or more additional subframes may be one-symbol subframes as a result of using the first numerology.

In some examples, UE 115-*d* may receive a periodic CAS, and may identify that the first subframe and the one or more additional subframes are within a same period of the CAS such that the first subframe and the one or more additional subframes are within a same MBSFN area. Each subframe within the same period of the cell acquisition subframe, but not including the cell acquisition subframe, may have the first numerology.

At 730, base station 105-*b* may transmit the one or more reference signals. At 735, UE 115-*d* may perform channel estimation (e.g., of the broadcast control channel) based on measurements of the one or more reference signals received over the first subframe and the one or more additional subframes.

At 740, base station 105-*b* may transmit the broadcast control channel. At 745, UE 115-*d* may decode the broadcast control channel based at least in part on the channel estimation.

Figure 8:
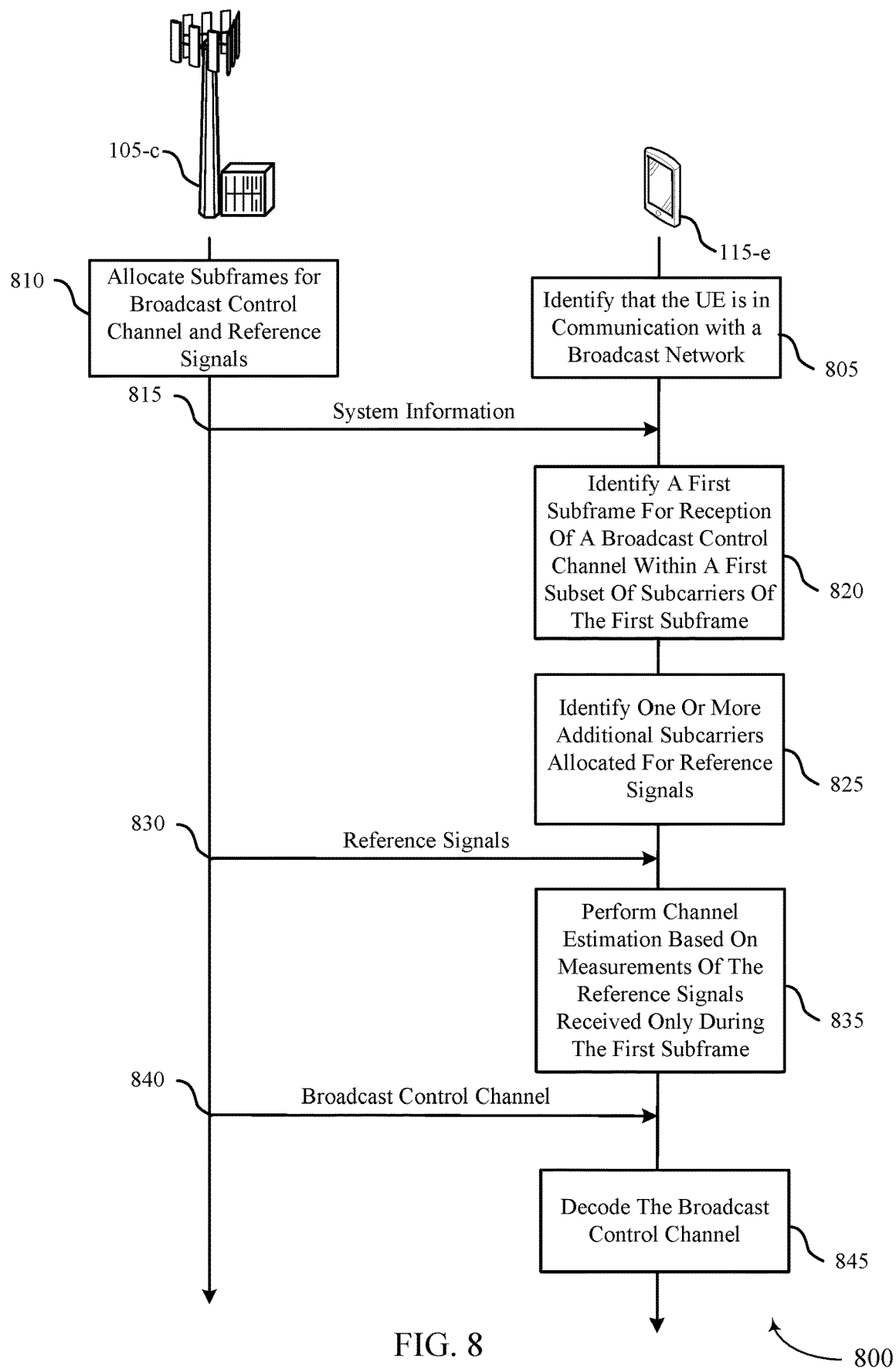
FIG. 8 illustrates an example of a process flow that supports broadcast control channel decoding in a dedicated carrier in accordance with aspects of the present disclosure.

FIG. 8 illustrates an example of a process flow 800 that supports broadcast control channel decoding in a dedicated carrier in accordance with aspects of the present disclosure. In some examples, process flow 800 may implement aspects of wireless communications system 100.

At 805, UE 115-*e* may identify that it is in communication with a broadcast network. UE 115-*e* may be in communication with the broadcast network via a dedicated carrier in accordance with a first numerology. The dedicated MBMS carrier may be a frequency carrier that supports only broadcast transmission and does not support unicast transmission.

At 810, base station 105-*c* may allocate subframes for a broadcast control channel and reference signals. Base station 105-*c* may allocate a first subframe for transmission of a broadcast control channel (e.g., an MCCH) within a first subset of subcarriers of the first subframe, and may allocate one or more additional subcarriers of the first subframe different from the first subset of subcarriers, for transmission of at least one or more reference signals. The broadcast control channel (e.g., the MCCH) may be used to schedule multimedia broadcast/multicast service (MBMS) transmissions.

At 815, base station 105-*b* may transmit system information to UE 115-*e*.

At 820, UE 115-*e* may identify the first subframe for reception of the broadcast control channel (e.g., the MCCH) within the first subset of subcarriers of the first subframe. The first subframe may be a one-symbol subframe as a result of using the first numerology.

At 825, UE 115-*e* may identify one or more additional subcarrier of the first subframe allocated for one or more reference signals. The one or more additional subcarriers of the first subframe may be different from the first subset of subcarriers. The one or more subcarriers of the first subframe have the first numerology and the one or more additional subframes have a second numerology that is different than the first numerology in some examples, the UE 115-*e* may determine that a first reference signal pattern within the one or more additional subcarriers of the subframe is different than a second reference signal pattern for one or more additional subframes different from the first subframe. In some examples, a reference signal density of the first reference signal pattern is more dense in a frequency domain than a reference signal density of the second reference signal pattern.

At 830, base station 105-*c* may transmit the one or more reference signals. At 835, UE 115-*e* may perform channel estimation based on measurements of the one or more reference signals received only during the first subframe.

At 840, base station 105-*c* may transmit the broadcast control channel. At 845, UE 115-*d* may decode the broadcast control channel.

Figure 9:
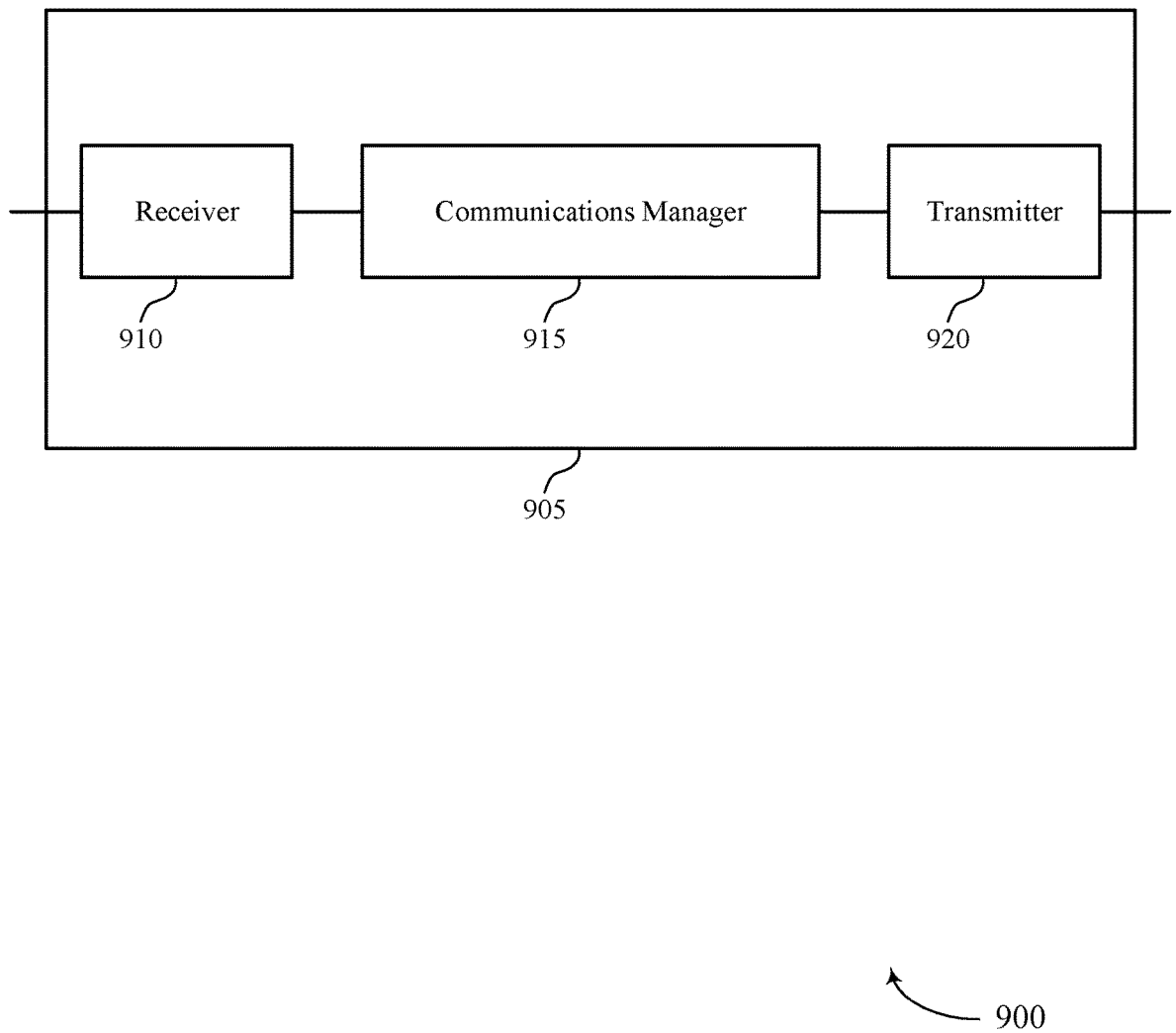
FIGS. 9 and 10 show block diagrams of devices that support broadcast control channel decoding in a dedicated carrier in accordance with aspects of the present disclosure.

FIG. 9 shows a block diagram 900 of a device 905 that supports broadcast control channel decoding in a dedicated carrier in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to broadcast control channel decoding in a dedicated carrier, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify that the UE is in communication with a broadcast network via a dedicated carrier in accordance with a first numerology, receive system information from the network, identify, based on the system information, a first subframe allocated for reception of a broadcast control channel and at least one or more reference signals, identify one or more additional subframes, different from the first subframe, as having the first numerology, perform channel estimation of the broadcast control channel based on measurements of the one or more reference signals received over the first subframe and the one or more additional subframes, and decode the broadcast control channel based on the channel estimation. The communications manager 915 may also identify that the UE is in communication with a broadcast network via a dedicated carrier in accordance with a first numerology, receive system information from the network, identify, based on the system information, a first subframe allocated for reception of a broadcast control channel within a first subset of subcarriers of the first subframe, identify one or more additional subcarriers of the first subframe different from the first subset of subcarriers, as being allocated for reception of at least one or more reference signals, perform channel estimation of the broadcast control channel based on measurements of the one or more reference signals received only during the first subframe, and decode the broadcast control channel based on the channel estimation. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

In some examples, the communications manager 915 may be implemented as an integrated circuit or chipset for a mobile device modem, and the receiver 910 and transmitter 920 may be implemented as analog components (e.g., amplifiers, filters, antennas) coupled with the mobile device modem to enable wireless transmission and reception over one or more bands.

The communications manager 915 as described herein may be implemented to realize one or more potential advantages. One implementation may support saved overhead at the base station, decreased power consumption during receiving and decoding at a device, improved system efficiency, increased battery life for the device, and improved user experience.

Figure 12:
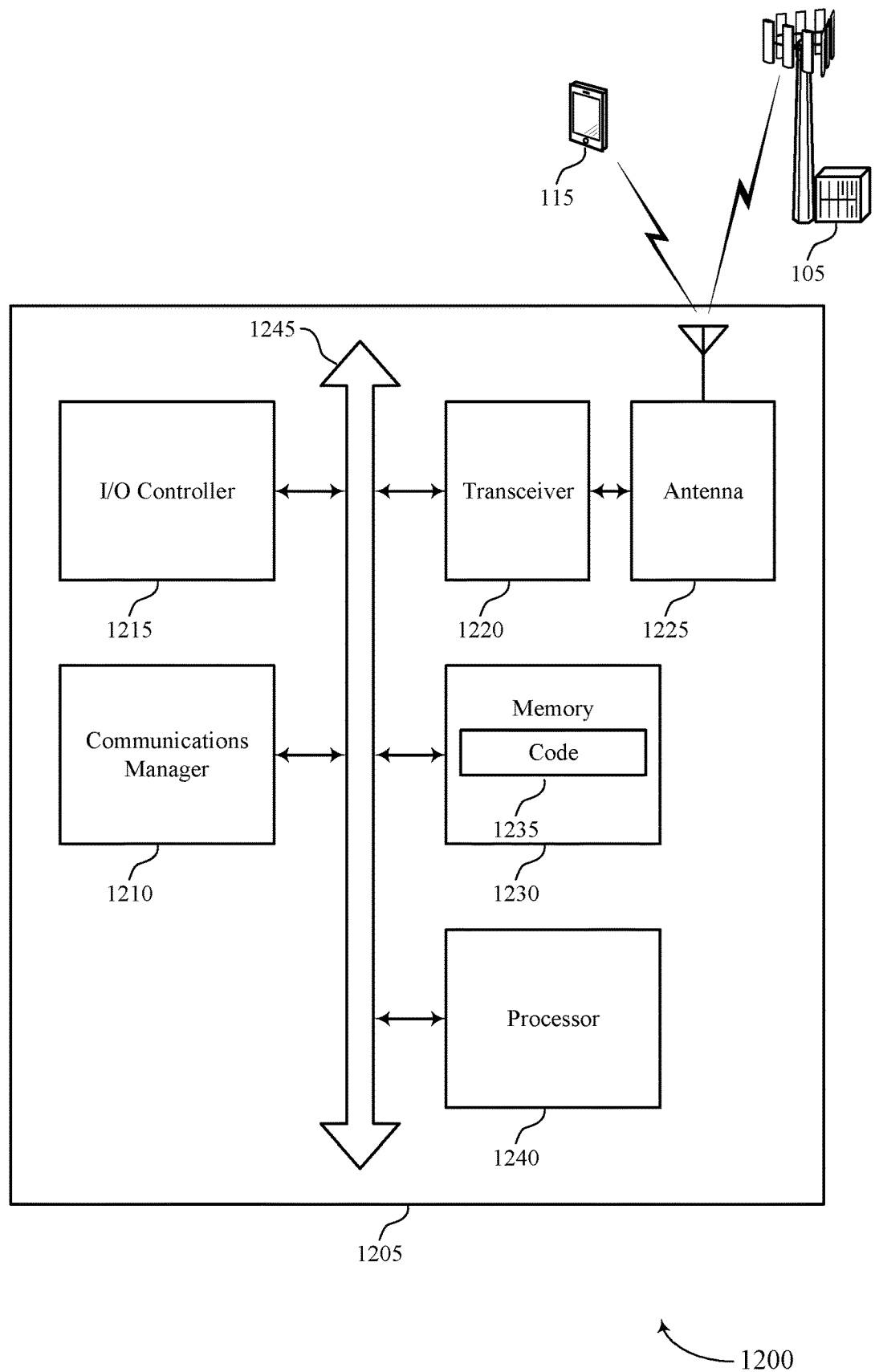
FIG. 12 shows a diagram of a system including a device that supports broadcast control channel decoding in a dedicated carrier in accordance with aspects of the present disclosure.

Based on techniques for efficiently communicating maximum number of layers for a device as described herein, a processor of a UE 115 (e.g., controlling the receiver 910, the transmitter 920, or a transceiver 1220 as described with respect to FIG. 12) may increase system efficiency and decrease unnecessary processing at a device.

Figure 10:
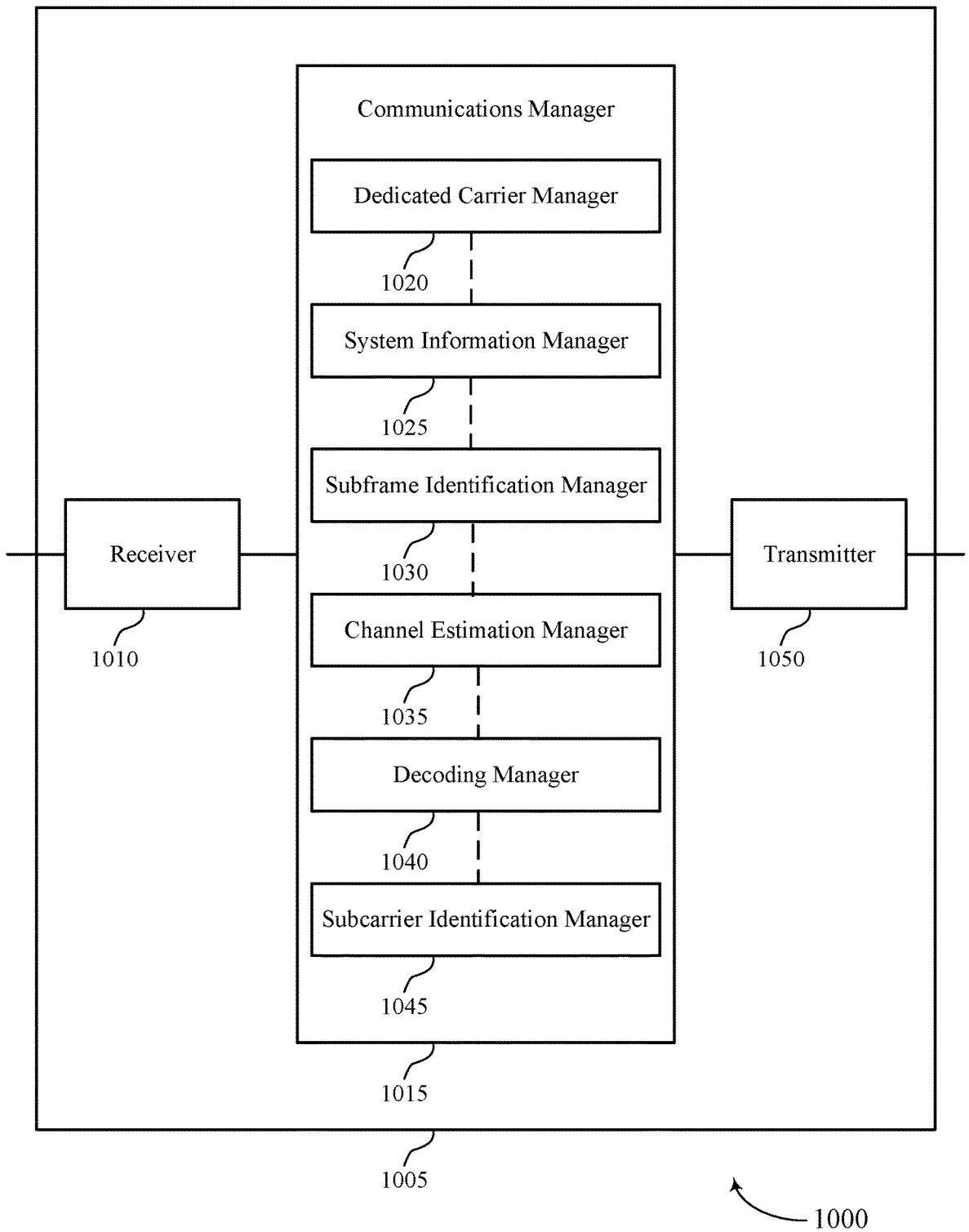

FIG. 10 shows a block diagram 1000 of a device 1005 that supports broadcast control channel decoding in a dedicated carrier in accordance with aspects of the present disclosure. The device 1005 may be an example of aspects of a device 905, or a UE 115 as described herein. The device 1005 may include a receiver 1010, a communications manager 1015, and a transmitter 1050. The device 1005 may also include a processor. Each of these components may be in communication with one another (e.g., via one or more buses).

The receiver 1010 may receive information such as packets, user data, or control information associated with various information channels (e.g., control channels, data channels, and information related to broadcast control channel decoding in a dedicated carrier, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a dedicated carrier manager 1020, a system information manager 1025, a subframe identification manager 1030, a channel estimation manager 1035, a decoding manager 1040, and a subcarrier identification manager 1045. The communications manager 1015 may be an example of aspects of the communications manager 1210 described herein.

The dedicated carrier manager 1020 may identify that the UE is in communication with a broadcast network via a dedicated carrier in accordance with a first numerology.

The system information manager 1025 may receive system information from the network.

The subframe identification manager 1030 may identify, based on the system information, a first subframe allocated for reception of a broadcast control channel and at least one or more reference signals and identify one or more additional subframes, different from the first subframe, as having the first numerology.

The channel estimation manager 1035 may perform channel estimation of the broadcast control channel based on measurements of the one or more reference signals received over the first subframe and the one or more additional subframes.

The decoding manager 1040 may decode the broadcast control channel based on the channel estimation.

The dedicated carrier manager 1020 may identify that the UE is in communication with a broadcast network via a dedicated carrier in accordance with a first numerology.

The system information manager 1025 may receive system information from the network.

The subframe identification manager 1030 may identify, based on the system information, a first subframe allocated for reception of a broadcast control channel within a first subset of subcarriers of the first subframe.

The subcarrier identification manager 1045 may identify one or more additional subcarriers of the first subframe different from the first subset of subcarriers, as being allocated for reception of at least one or more reference signals.

The channel estimation manager 1035 may perform channel estimation of the broadcast control channel based on measurements of the one or more reference signals received only during the first subframe.

The decoding manager 1040 may decode the broadcast control channel based on the channel estimation.

The transmitter 1050 may transmit signals generated by other components of the device 1005. In some examples, the transmitter 1050 may be collocated with a receiver 1010 in a transceiver module. For example, the transmitter 1050 may be an example of aspects of the transceiver 1220 described with reference to FIG. 12. The transmitter 1050 may utilize a single antenna or a set of antennas.

Figure 11:
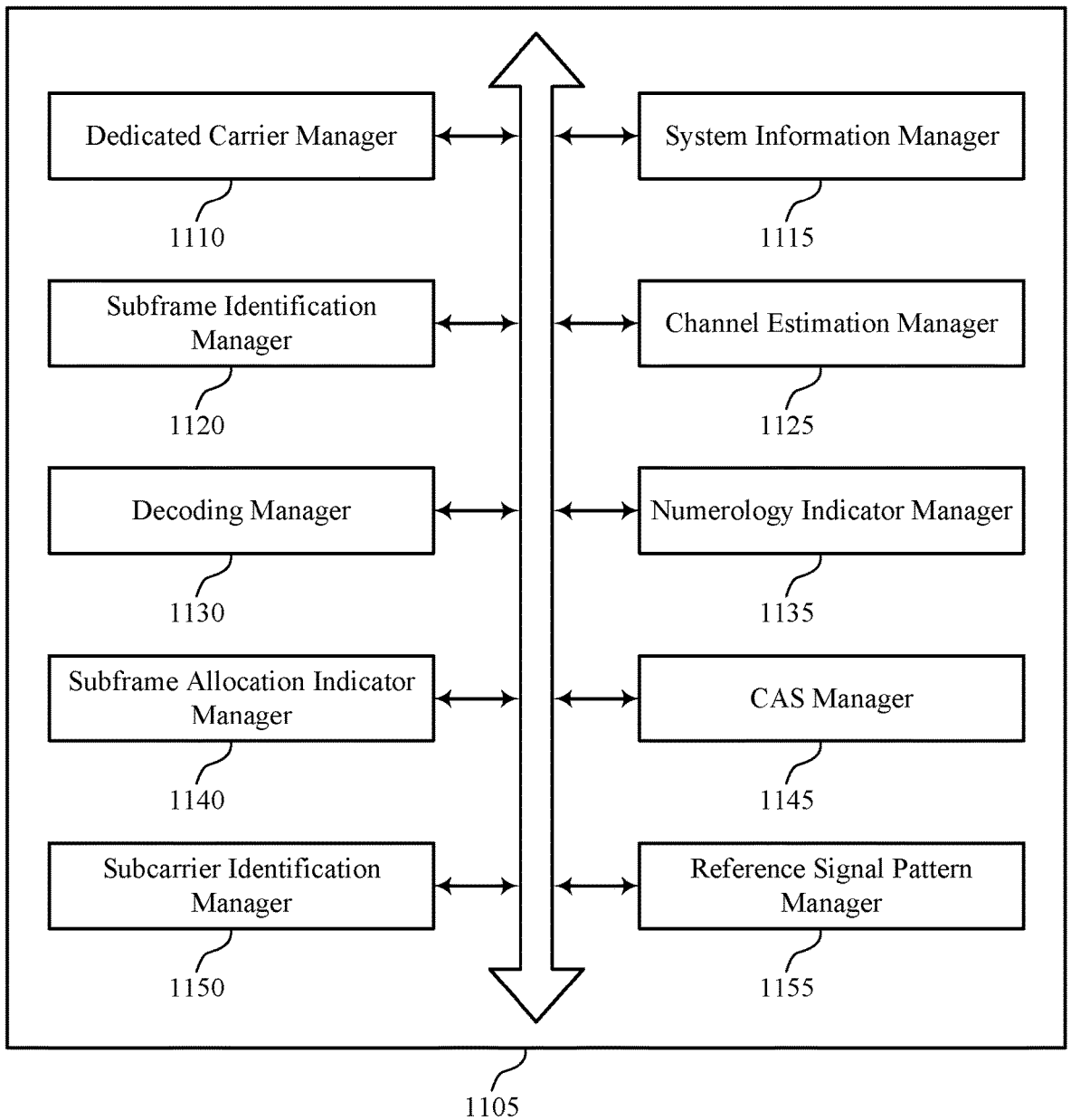
FIG. 11 shows a block diagram of a communications manager that supports broadcast control channel decoding in a dedicated carrier in accordance with aspects of the present disclosure.

FIG. 11 shows a block diagram 1100 of a communications manager 1105 that supports broadcast control channel decoding in a dedicated carrier in accordance with aspects of the present disclosure. The communications manager 1105 may be an example of aspects of a communications manager 915, a communications manager 1015, or a communications manager 1210 described herein. The communications manager 1105 may include a dedicated carrier manager 1110, a system information manager 1115, a subframe identification manager 1120, a channel estimation manager 1125, a decoding manager 1130, a numerology indicator manager 1135, a subframe allocation indicator manager 1140, a CAS manager 1145, a subcarrier identification manager 1150, and a reference signal pattern manager 1155. Each of these modules may communicate, directly or indirectly, with one another (e.g., via one or more buses).

The dedicated carrier manager 1110 may identify that the UE is in communication with a broadcast network via a dedicated carrier in accordance with a first numerology. In some examples, the dedicated carrier manager 1110 may identify that the UE is in communication with a broadcast network via a dedicated carrier in accordance with a first numerology. In some cases, the broadcast control channel is a multicast control channel (MCCH). In some cases, the broadcast control channel is a multicast control channel (MCCH).

The system information manager 1115 may receive system information from the network. In some examples, the system information manager 1115 may receive system information from the network. In some examples, the system information manager 1115 may identify, based on the system information, an adjacent subframe to the first subframe, the adjacent subframe including the one or more additional subframes, where identifying the one or more additional subframes is based on the identifying the adjacent subframe. In some cases, the system information further indicates that the one or more additional subframes are allocated for reception of the at least one or more reference signals.

The subframe identification manager 1120 may identify, based on the system information, a first subframe allocated for reception of a broadcast control channel and at least one or more reference signals. In some examples, the subframe identification manager 1120 may identify one or more additional subframes, different from the first subframe, as having the first numerology.

In some examples, the subframe identification manager 1120 may identify, based on the system information, a first subframe allocated for reception of a broadcast control channel within a first subset of subcarriers of the first subframe. In some examples, the subframe identification manager 1120 may determine that the one or more additional subframes have the first numerology based on a predetermined relationship between the first subframe and the one or more additional subframes. In some cases, the first subframe and the one or more additional subframes are each one-symbol subframes as a result of using the first numerology. In some cases, the one or more additional subframes having the first numerology includes at least two subframes. In some cases, the first subframe is a one-symbol subframe as a result of using the first numerology.

The channel estimation manager 1125 may perform channel estimation of the broadcast control channel based on measurements of the one or more reference signals received over the first subframe and the one or more additional subframes. In some examples, the channel estimation manager 1125 may perform channel estimation of the broadcast control channel based on measurements of the one or more reference signals received only during the first subframe.

The decoding manager 1130 may decode the broadcast control channel based on the channel estimation. In some examples, the decoding manager 1130 may decode the broadcast control channel based on the channel estimation.

The subcarrier identification manager 1150 may identify one or more additional subcarriers of the first subframe different from the first subset of subcarriers, as being allocated for reception of at least one or more reference signals. In some cases, the one or more subcarriers of the first subframe have the first numerology and the one or more additional subframes have a second numerology that is different than the first numerology.

The numerology indicator manager 1135 may identify a numerology indicator in the system information. In some examples, the numerology indicator manager 1135 may determine, based on the numerology indicator, that each of the one or more additional subframes has the first numerology. In some cases, the numerology indicator includes one bit.

The subframe allocation indicator manager 1140 may receive a subframe allocation indicator in the system information. In some examples, the subframe allocation indicator manager 1140 may determine the one or more additional subframes from the subframe allocation indicator. In some cases, the subframe allocation indicator includes a set of bits or a bitmap.

The CAS manager 1145 may receive a periodic cell acquisition subframe. In some examples, the CAS manager 1145 may identify that the first subframe and the one or more additional subframes are within a same period of the cell acquisition subframe such that the first subframe and the one or more additional subframes are within a same multicast-broadcast single-frequency network (MBSFN) area. In some cases, each subframe within the same period of the cell acquisition subframe, but not including the cell acquisition subframe, has the first numerology.

The reference signal pattern manager 1155 may identify, based on the system information, that a first reference signal pattern within the one or more additional subcarriers of the subframe is different than a second reference signal pattern for one or more additional subframes different from the first subframe. In some cases, a reference signal density of the first reference signal pattern is more dense in a frequency domain than a reference signal density of the second reference signal pattern.

FIG. 12 shows a diagram of a system 1200 including a device 1205 that supports broadcast control channel decoding in a dedicated carrier in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may identify that the UE is in communication with a broadcast network via a dedicated carrier in accordance with a first numerology, receive system information from the network, identify, based on the system information, a first subframe allocated for reception of a broadcast control channel and at least one or more reference signals, identify one or more additional subframes, different from the first subframe, as having the first numerology, perform channel estimation of the broadcast control channel based on measurements of the one or more reference signals received over the first subframe and the one or more additional subframes, and decode the broadcast control channel based on the channel estimation. The communications manager 1210 may also identify that the UE is in communication with a broadcast network via a dedicated carrier in accordance with a first numerology, receive system information from the network, identify, based on the system information, a first subframe allocated for reception of a broadcast control channel within a first subset of subcarriers of the first subframe, identify one or more additional subcarriers of the first subframe different from the first subset of subcarriers, as being allocated for reception of at least one or more reference signals, perform channel estimation of the broadcast control channel based on measurements of the one or more reference signals received only during the first subframe, and decode the broadcast control channel based on the channel estimation.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting broadcast control channel decoding in a dedicated carrier).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
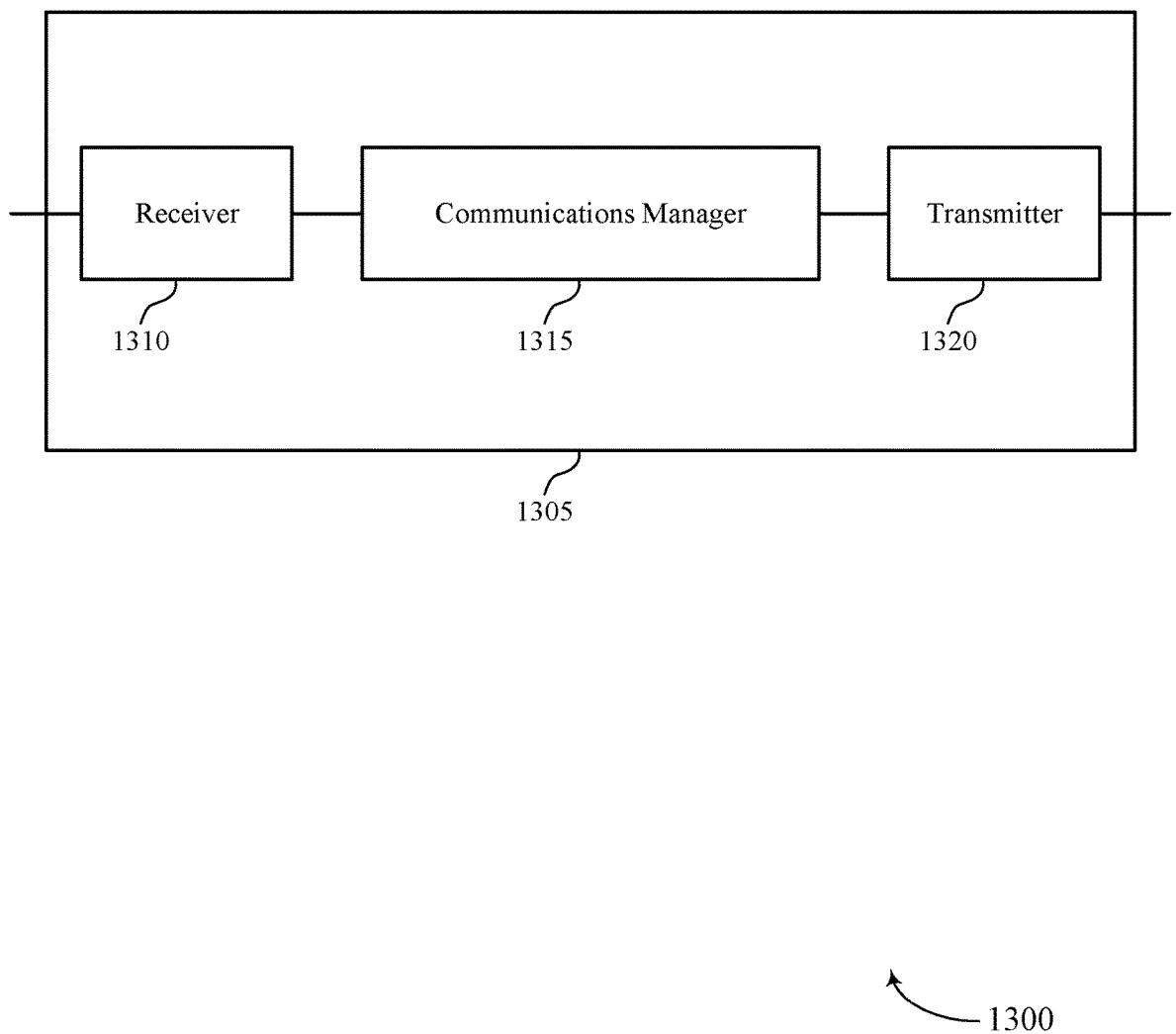
FIGS. 13 and 14 show block diagrams of devices that support broadcast control channel decoding in a dedicated carrier in accordance with aspects of the present disclosure.

FIG. 13 shows a block diagram 1300 of a device 1305 that supports broadcast control channel decoding in a dedicated carrier in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to broadcast control channel decoding in a dedicated carrier, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may identify that the base station is operating within a broadcast network and in communication with one or more user equipment (UEs) via a dedicated carrier in accordance with a first numerology, allocate a first subframe for transmission of a broadcast control channel and at least one or more reference signals, allocate one or more additional subframes, different from the first subframe and having the first numerology, for transmission of the at least one or more reference signals, transmit system information indicating that the first subframe and the one or more additional subframes each use the first numerology, transmit the at least one or more reference signals over the first subframe and the one or more additional subframes, and transmit the broadcast control channel over the first subframe. The communications manager 1315 may also identify that the base station is operating within a broadcast network and in communication with one or more user equipment (UEs) via a dedicated carrier in accordance with a first numerology, allocate a first subframe for transmission of a broadcast control channel within a first subset of subcarriers of the first subframe, allocate one or more additional subcarriers of the first subframe different from the first subset of subcarriers, for transmission of at least one or more reference signals, transmit system information indicating the first subset of subcarriers of the first subframe and the one or more additional subcarriers of the first subframe, transmit the at least one or more reference signals over only the one or more additional subcarriers during the first subframe, and transmit the broadcast control channel over the first subset of subcarriers of the first subframe. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
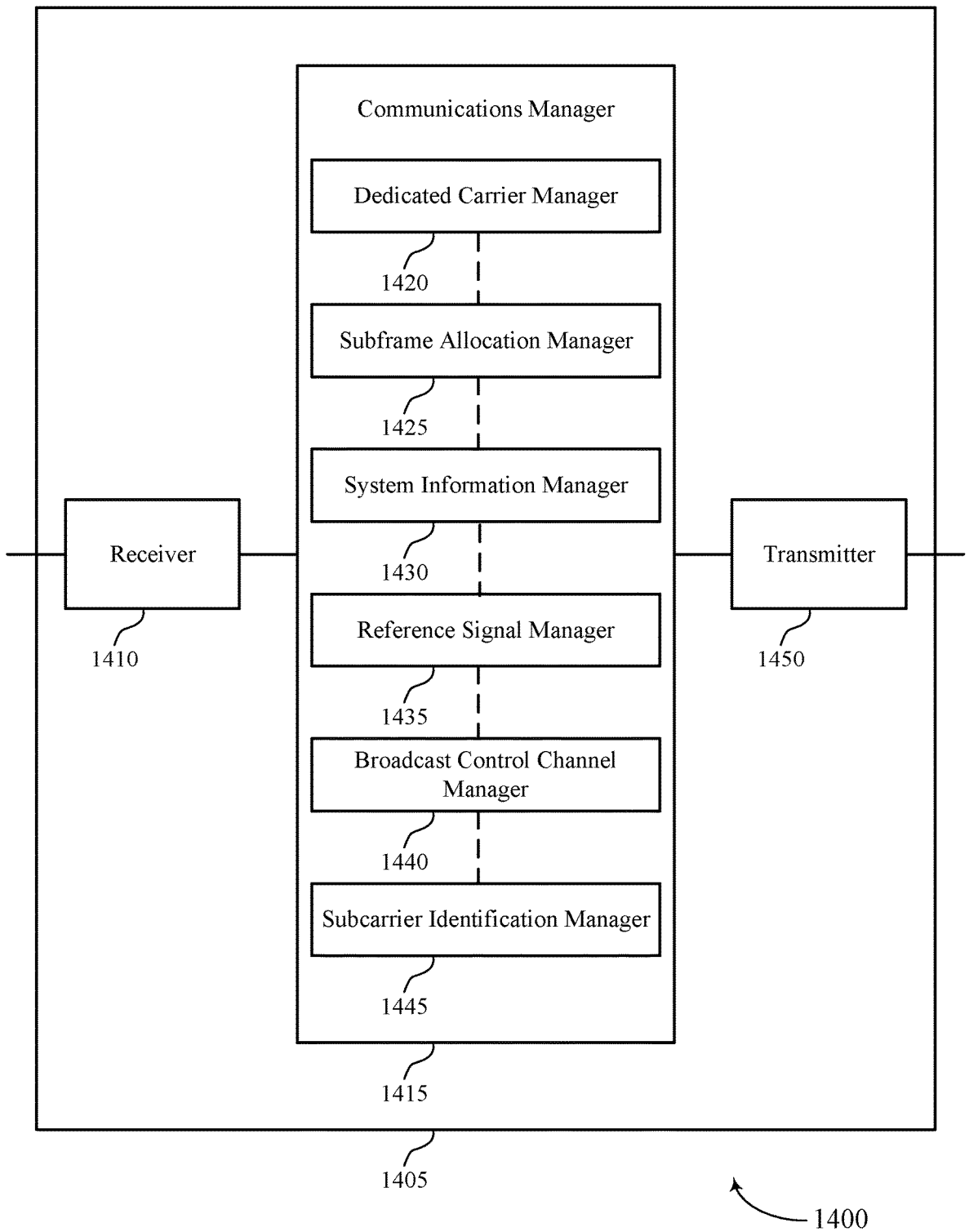

FIG. 14 shows a block diagram 1400 of a device 1405 that supports broadcast control channel decoding in a dedicated carrier in accordance with aspects of the present disclosure. The device 1405 may be an example of aspects of a device 1305, or a base station 105 as described herein. The device 1405 may include a receiver 1410, a communications manager 1415, and a transmitter 1450. The device 1405 may also include a processor. Each of these components may be in communication with one another (e.g., via one or more buses).

The receiver 1410 may receive information such as packets, user data, or control information associated with various information channels (e.g., control channels, data channels, and information related to broadcast control channel decoding in a dedicated carrier, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a dedicated carrier manager 1420, a subframe allocation manager 1425, a system information manager 1430, a reference signal manager 1435, a broadcast control channel manager 1440, and a subcarrier identification manager 1445. The communications manager 1415 may be an example of aspects of the communications manager 1610 described herein.

The dedicated carrier manager 1420 may identify that the base station is operating within a broadcast network and in communication with one or more user equipment (UEs) via a dedicated carrier in accordance with a first numerology.

The subframe allocation manager 1425 may allocate a first subframe for transmission of a broadcast control channel and at least one or more reference signals and allocate one or more additional subframes, different from the first subframe and having the first numerology, for transmission of the at least one or more reference signals.

The system information manager 1430 may transmit system information indicating that the first subframe and the one or more additional subframes each use the first numerology.

The reference signal manager 1435 may transmit the at least one or more reference signals over the first subframe and the one or more additional subframes.

The broadcast control channel manager 1440 may transmit the broadcast control channel over the first subframe.

The dedicated carrier manager 1420 may identify that the base station is operating within a broadcast network and in communication with one or more user equipment (UEs) via a dedicated carrier in accordance with a first numerology.

The subframe allocation manager 1425 may allocate a first subframe for transmission of a broadcast control channel within a first subset of subcarriers of the first subframe.

The subcarrier identification manager 1445 may allocate one or more additional subcarriers of the first subframe different from the first subset of subcarriers, for transmission of at least one or more reference signals.

The system information manager 1430 may transmit system information indicating the first subset of subcarriers of the first subframe and the one or more additional subcarriers of the first subframe.

The reference signal manager 1435 may transmit the at least one or more reference signals over only the one or more additional subcarriers during the first subframe.

The broadcast control channel manager 1440 may transmit the broadcast control channel over the first subset of subcarriers of the first subframe.

The transmitter 1450 may transmit signals generated by other components of the device 1405. In some examples, the transmitter 1450 may be collocated with a receiver 1410 in a transceiver module. For example, the transmitter 1450 may be an example of aspects of the transceiver 1620 described with reference to FIG. 16. The transmitter 1450 may utilize a single antenna or a set of antennas.

Figure 15:
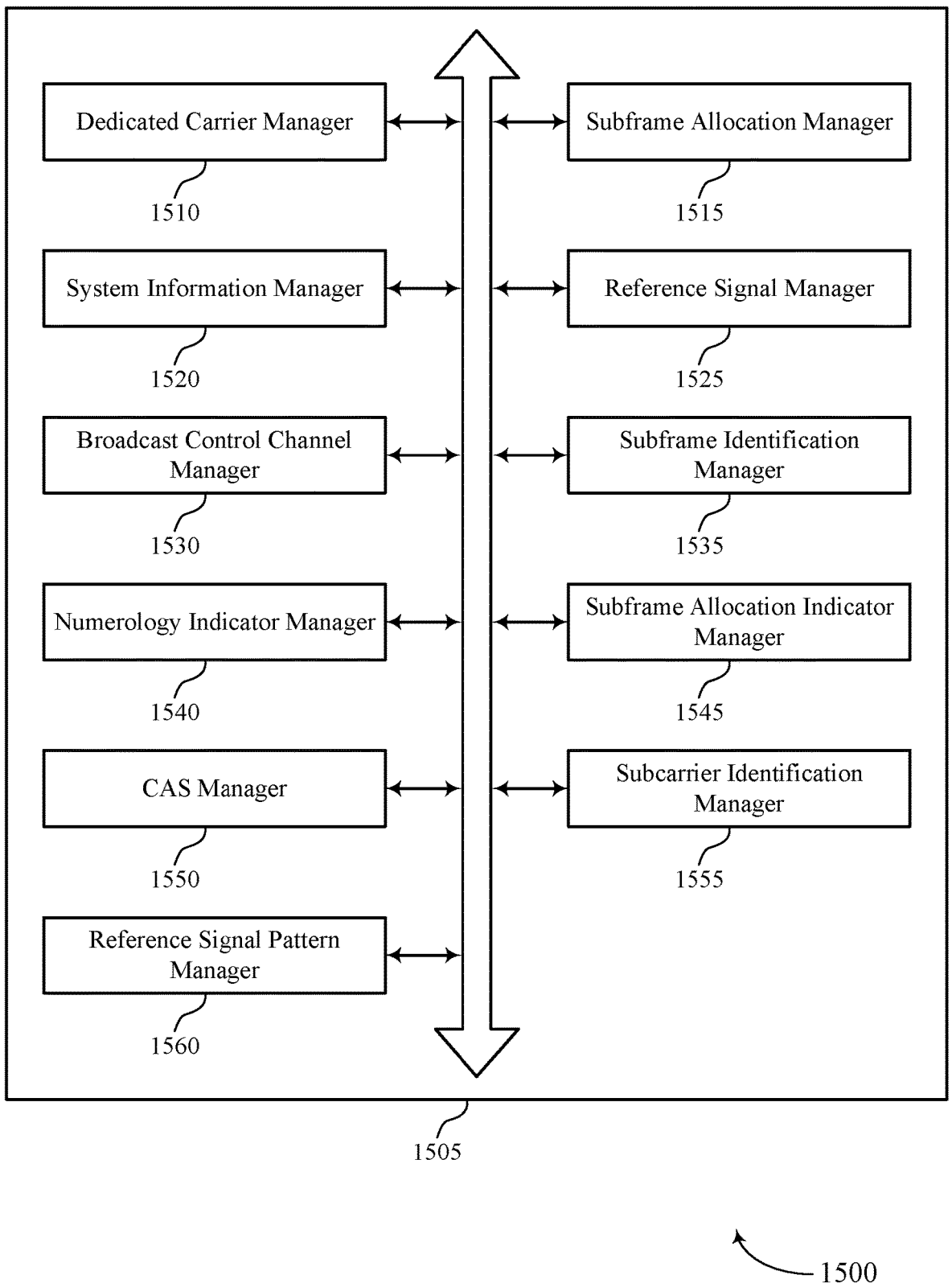
FIG. 15 shows a block diagram of a communications manager that supports broadcast control channel decoding in a dedicated carrier in accordance with aspects of the present disclosure.

FIG. 15 shows a block diagram 1500 of a communications manager 1505 that supports broadcast control channel decoding in a dedicated carrier in accordance with aspects of the present disclosure. The communications manager 1505 may be an example of aspects of a communications manager 1315, a communications manager 1415, or a communications manager 1610 described herein. The communications manager 1505 may include a dedicated carrier manager 1510, a subframe allocation manager 1515, a system information manager 1520, a reference signal manager 1525, a broadcast control channel manager 1530, a subframe identification manager 1535, a numerology indicator manager 1540, a subframe allocation indicator manager 1545, a CAS manager 1550, a subcarrier identification manager 1555, and a reference signal pattern manager 1560. Each of these modules may communicate, directly or indirectly, with one another (e.g., via one or more buses).

The dedicated carrier manager 1510 may identify that the base station is operating within a broadcast network and in communication with one or more user equipment (UEs) via a dedicated carrier in accordance with a first numerology.

In some examples, the dedicated carrier manager 1510 may identify that the base station is operating within a broadcast network and in communication with one or more user equipment (UEs) via a dedicated carrier in accordance with a first numerology. In some cases, the broadcast control channel is a multicast control channel (MCCH). In some cases, the broadcast control channel is a multicast control channel (MCCH).

The subframe allocation manager 1515 may allocate a first subframe for transmission of a broadcast control channel and at least one or more reference signals.

In some examples, the subframe allocation manager 1515 may allocate one or more additional subframes, different from the first subframe and having the first numerology, for transmission of the at least one or more reference signals. In some examples, the subframe allocation manager 1515 may allocate a first subframe for transmission of a broadcast control channel within a first subset of subcarriers of the first subframe.

In some examples, the subframe allocation manager 1515 may identify a predetermined relationship between the first subframe and the one or more additional subframes, where allocating the first subframe and allocating the one or more additional subframes is based on the predetermined relationship. In some examples, identifying an adjacent subframe to the first subframe, where allocating the one or more additional subframes further includes allocating the one or more additional subframes in the adjacent subframe. In some cases, the one or more additional subframes having the first numerology includes at least two subframes. In some cases, the first subframe is a one-symbol subframe as a result of using the first numerology. In some cases, the one or more subcarriers of the first subframe have the first numerology and the one or more additional subframes have a second numerology that is different than the first numerology.

The system information manager 1520 may transmit system information indicating that the first subframe and the one or more additional subframes each use the first numerology.

In some examples, the system information manager 1520 may transmit system information indicating the first subset of subcarriers of the first subframe and the one or more additional subcarriers of the first subframe.

The reference signal manager 1525 may transmit the at least one or more reference signals over the first subframe and the one or more additional subframes. In some examples, the reference signal manager 1525 may transmit the at least one or more reference signals over only the one or more additional subcarriers during the first subframe.

The broadcast control channel manager 1530 may transmit the broadcast control channel over the first subframe. In some examples, the broadcast control channel manager 1530 may transmit the broadcast control channel over the first subset of subcarriers of the first subframe.

The subcarrier identification manager 1555 may allocate one or more additional subcarriers of the first subframe different from the first subset of subcarriers, for transmission of at least one or more reference signals.

The subframe identification manager 1535 may determine that the first subframe and the one or more additional subframes are each one-symbol subframes as a result of using the first numerology. In some cases, the system information further indicates that the one or more additional subframes are allocated for reception of the at least one or more reference signals.

The numerology indicator manager 1540 may transmit, in the system information, a numerology indicator that indicates that each of the one or more additional subframes has the first numerology. In some cases, the numerology indicator includes one bit.

The subframe allocation indicator manager 1545 may transmit, in the system information, a subframe allocation indicator that indicates the one or more additional subframes. In some cases, the subframe allocation indicator includes a set of bits or a bitmap.

The CAS manager 1550 may transmit a periodic cell acquisition subframe. In some examples, the CAS manager 1550 may allocate the first subframe and the one or more additional subframes within a same period of the cell acquisition subframe such that the first subframe and the one or more additional subframes are within a same multicast-broadcast single-frequency network (MBSFN) area. In some cases, each subframe within the same period of the cell acquisition subframe, but not including the cell acquisition subframe, has the first numerology.

The reference signal pattern manager 1560 may transmit, in the system information, an indication of a first reference signal pattern within the one or more additional subcarriers of the subframe that is different than a second reference signal pattern for one or more additional subframes different from the first subframe. In some cases, a reference signal density of the first reference signal pattern is more dense in a frequency domain than a reference signal density of the second reference signal pattern.

Figure 16:
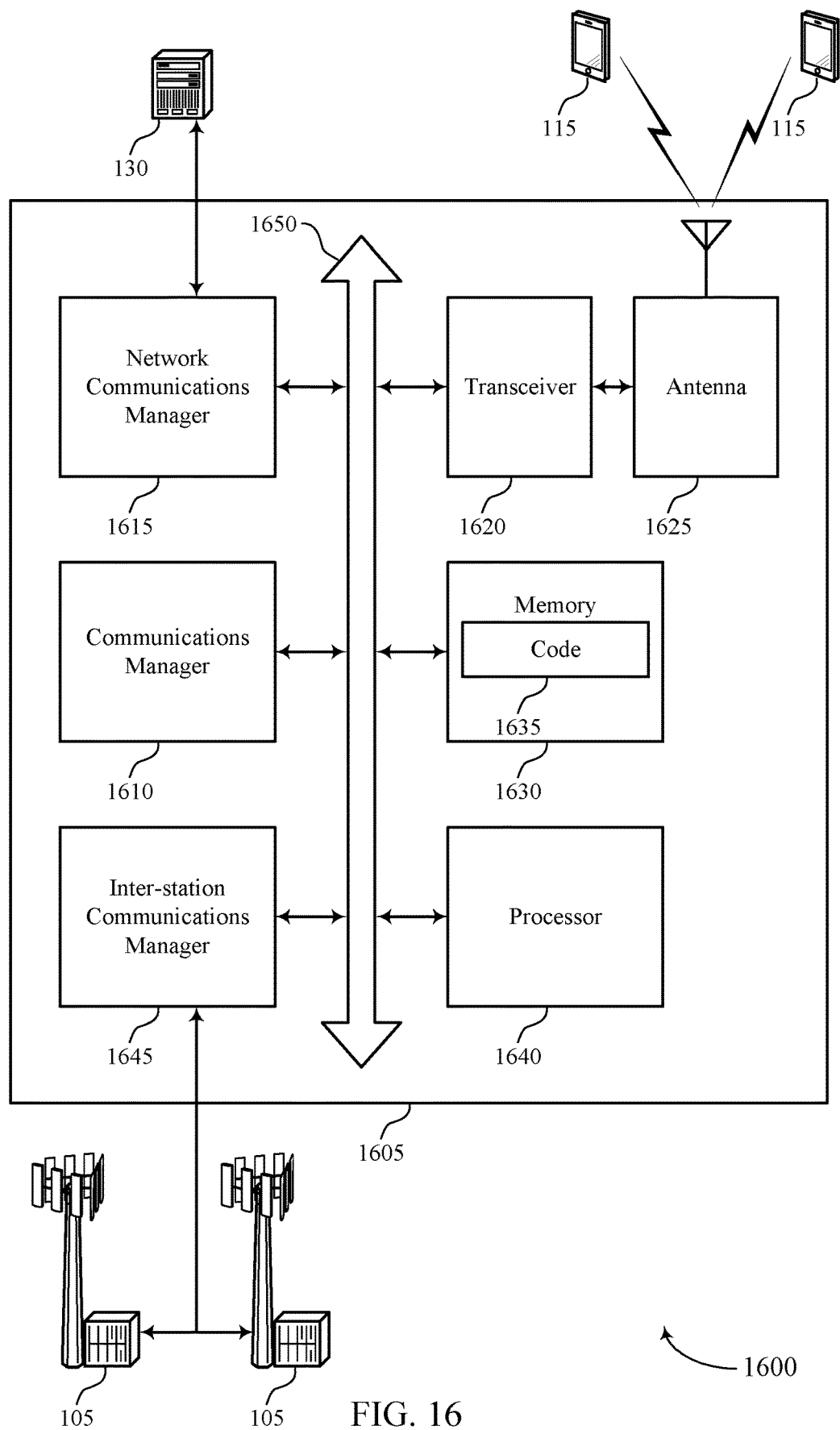
FIG. 16 shows a diagram of a system including a device that supports broadcast control channel decoding in a dedicated carrier in accordance with aspects of the present disclosure.

FIG. 16 shows a diagram of a system 1600 including a device 1605 that supports broadcast control channel decoding in a dedicated carrier in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may identify that the base station is operating within a broadcast network and in communication with one or more user equipment (UEs) via a dedicated carrier in accordance with a first numerology, allocate a first subframe for transmission of a broadcast control channel and at least one or more reference signals, allocate one or more additional subframes, different from the first subframe and having the first numerology, for transmission of the at least one or more reference signals, transmit system information indicating that the first subframe and the one or more additional subframes each use the first numerology, transmit the at least one or more reference signals over the first subframe and the one or more additional subframes, and transmit the broadcast control channel over the first subframe. The communications manager 1610 may also identify that the base station is operating within a broadcast network and in communication with one or more user equipment (UEs) via a dedicated carrier in accordance with a first numerology, allocate a first subframe for transmission of a broadcast control channel within a first subset of subcarriers of the first subframe, allocate one or more additional subcarriers of the first subframe different from the first subset of subcarriers, for transmission of at least one or more reference signals, transmit system information indicating the first subset of subcarriers of the first subframe and the one or more additional subcarriers of the first subframe, transmit the at least one or more reference signals over only the one or more additional subcarriers during the first subframe, and transmit the broadcast control channel over the first subset of subcarriers of the first subframe.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting broadcast control channel decoding in a dedicated carrier).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
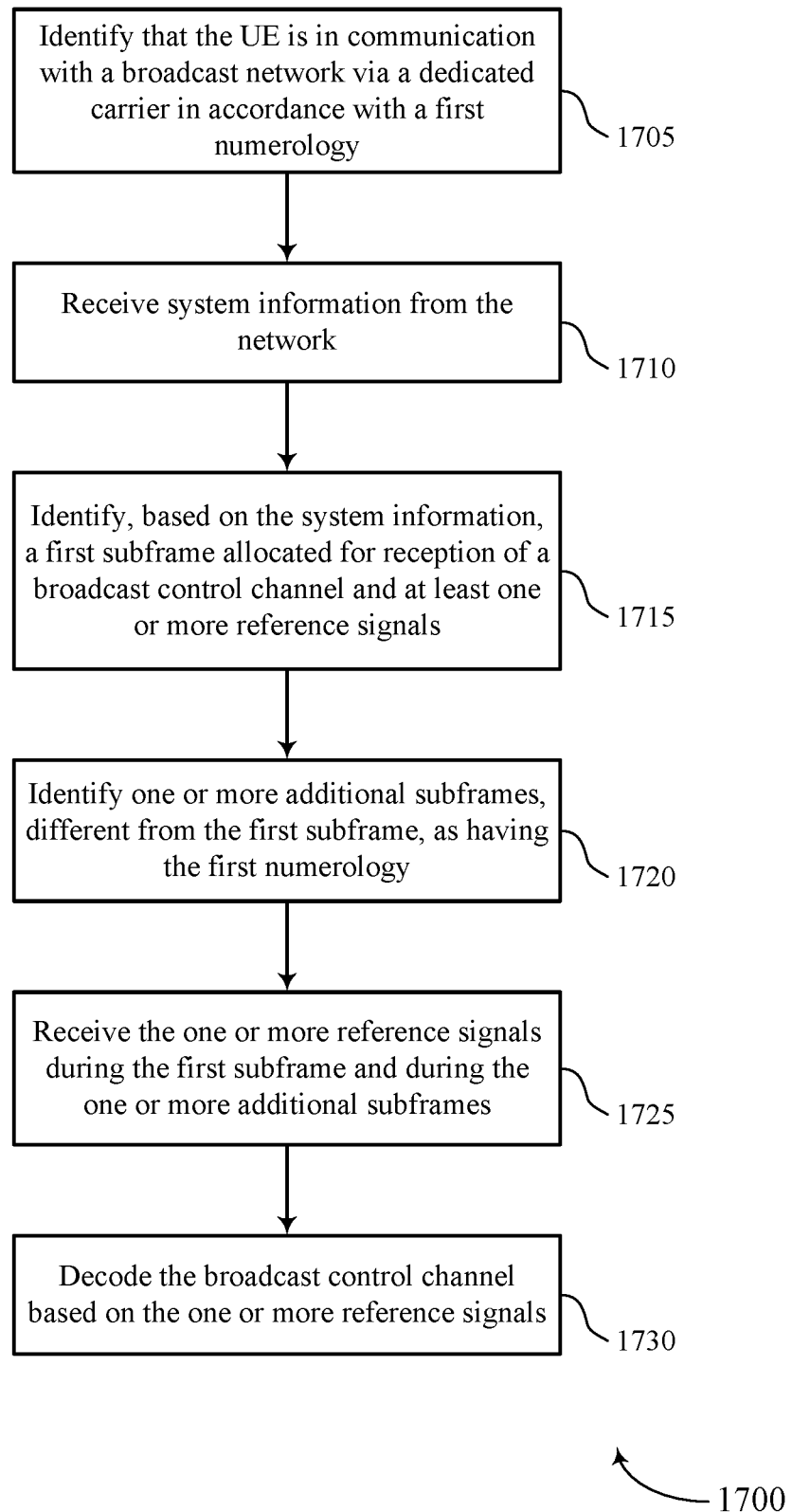
FIGS. 17 through 20 show flowcharts illustrating methods that support broadcast control channel decoding in a dedicated carrier in accordance with aspects of the present disclosure.

FIG. 17 shows a flowchart illustrating a method 1700 that supports broadcast control channel decoding in a dedicated carrier in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally, or alternatively, a UE may perform aspects of the functions described below using special-purpose hardware.

At 1705, the UE may identify that the UE is in communication with a broadcast network via a dedicated carrier in accordance with a first numerology. The operations of 1705 may be performed according to the methods described herein. In some examples, aspects of the operations of 1705 may be performed by a dedicated carrier manager as described with reference to FIGS. 9 through 12.

At 1710, the UE may receive system information from the network. The operations of 1710 may be performed according to the methods described herein. In some examples, aspects of the operations of 1710 may be performed by a system information manager as described with reference to FIGS. 9 through 12.

At 1715, the UE may identify, based on the system information, a first subframe allocated for reception of a broadcast control channel and at least one or more reference signals. The operations of 1715 may be performed according to the methods described herein. In some examples, aspects of the operations of 1715 may be performed by a subframe identification manager as described with reference to FIGS. 9 through 12.

At 1720, the UE may identify one or more additional subframes, different from the first subframe, as having the first numerology. The operations of 1720 may be performed according to the methods described herein. In some examples, aspects of the operations of 1720 may be performed by a subframe identification manager as described with reference to FIGS. 9 through 12.

At 1725, the UE may receive the one or more reference signals during the first subframe and during the one or more additional subframes. The operations of 1725 may be performed according to the methods described herein. In some examples, aspects of the operations of 1725 may be performed by a channel estimation manager as described with reference to FIGS. 9 through 12.

At 1730, the UE may decode the broadcast control channel based on the one or more reference signals. The operations of 1730 may be performed according to the methods described herein. In some examples, aspects of the operations of 1730 may be performed by a decoding manager as described with reference to FIGS. 9 through 12.

Figure 18:
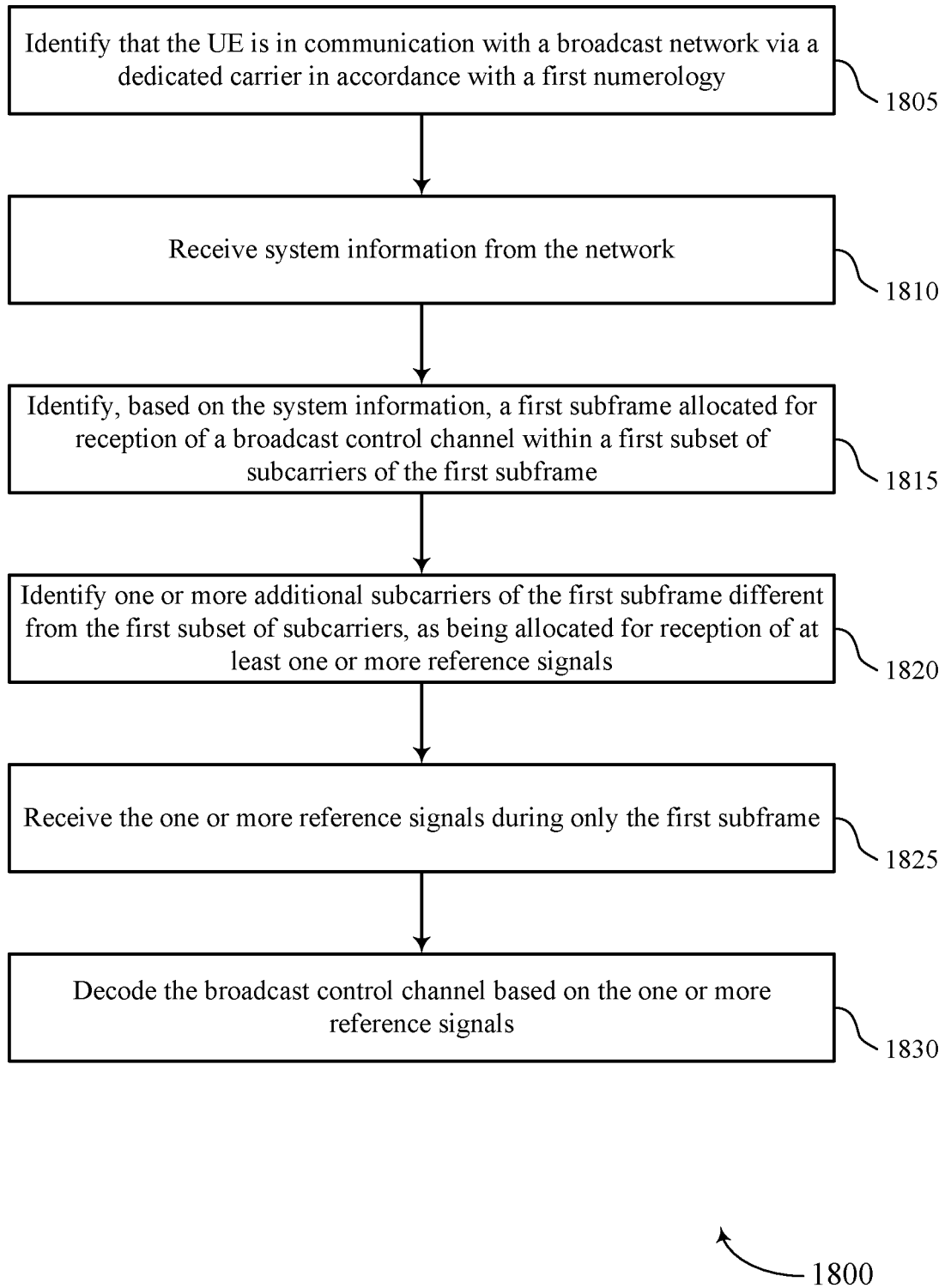

FIG. 18 shows a flowchart illustrating a method 1800 that supports broadcast control channel decoding in a dedicated carrier in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described below. Additionally, or alternatively, a UE may perform aspects of the functions described below using special-purpose hardware.

At 1805, the UE may identify that the UE is in communication with a broadcast network via a dedicated carrier in accordance with a first numerology. The operations of 1805 may be performed according to the methods described herein. In some examples, aspects of the operations of 1805 may be performed by a dedicated carrier manager as described with reference to FIGS. 9 through 12.

At 1810, the UE may receive system information from the network. The operations of 1810 may be performed according to the methods described herein. In some examples, aspects of the operations of 1810 may be performed by a system information manager as described with reference to FIGS. 9 through 12.

At 1815, the UE may identify, based on the system information, a first subframe allocated for reception of a broadcast control channel within a first subset of subcarriers of the first subframe. The operations of 1815 may be performed according to the methods described herein. In some examples, aspects of the operations of 1815 may be performed by a subframe identification manager as described with reference to FIGS. 9 through 12.

At 1820, the UE may identify one or more additional subcarriers of the first subframe different from the first subset of subcarriers, as being allocated for reception of at least one or more reference signals. The operations of 1820 may be performed according to the methods described herein. In some examples, aspects of the operations of 1820 may be performed by a subcarrier identification manager as described with reference to FIGS. 9 through 12.

At 1825, the UE may receive the one or more reference signals during only the first subframe. The operations of 1825 may be performed according to the methods described herein. In some examples, aspects of the operations of 1825 may be performed by a channel estimation manager as described with reference to FIGS. 9 through 12.

At 1830, the UE may decode the broadcast control channel based on the one or more reference signals. The operations of 1830 may be performed according to the methods described herein. In some examples, aspects of the operations of 1830 may be performed by a decoding manager as described with reference to FIGS. 9 through 12.

Figure 19:
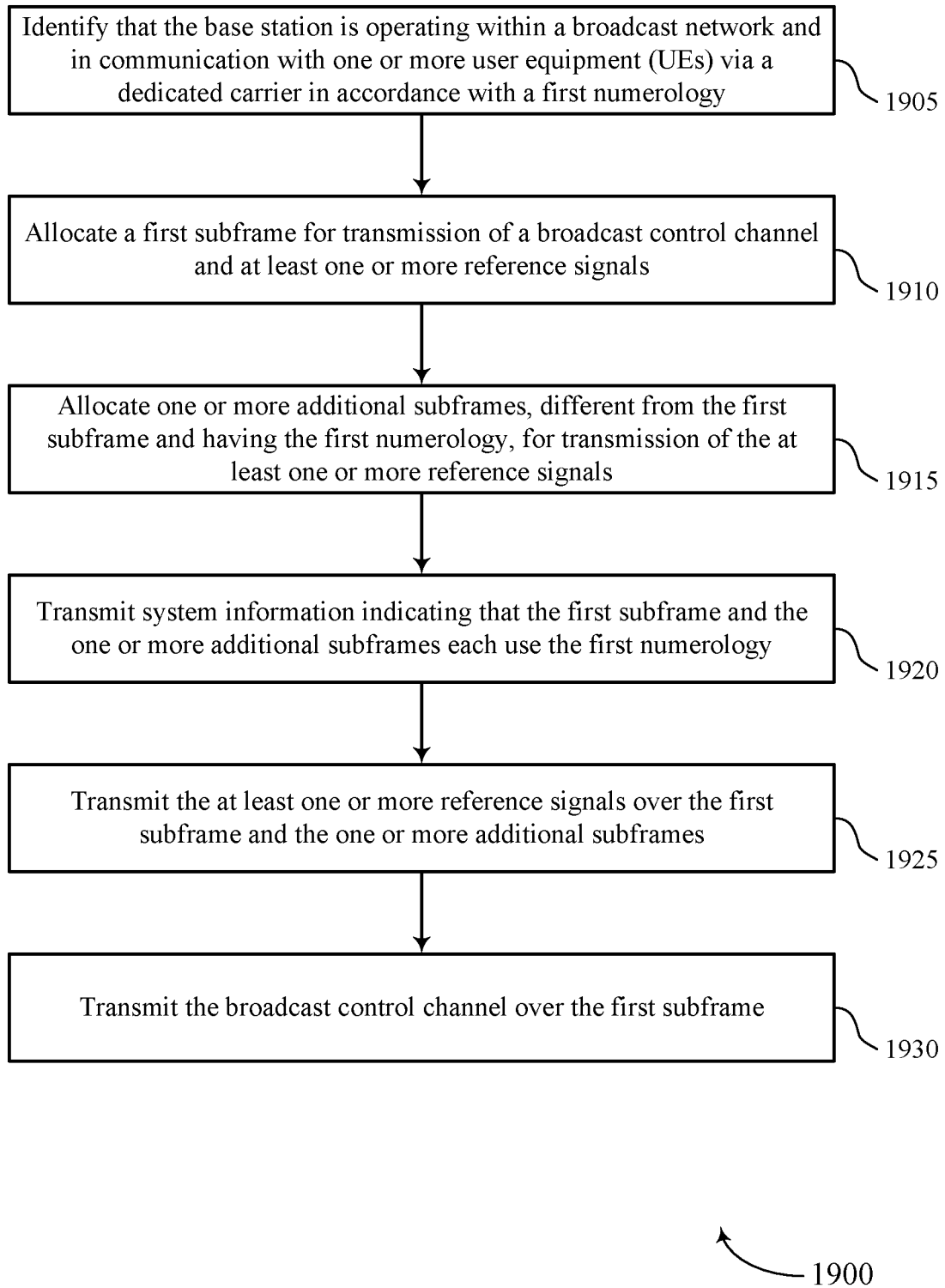

FIG. 19 shows a flowchart illustrating a method 1900 that supports broadcast control channel decoding in a dedicated carrier in accordance with aspects of the present disclosure. The operations of method 1900 may be implemented by a base station 105 or its components as described herein. For example, the operations of method 1900 may be performed by a communications manager as described with reference to FIGS. 13 through 16. In some examples, a base station may execute a set of instructions to control the functional elements of the base station to perform the functions described below. Additionally, or alternatively, a base station may perform aspects of the functions described below using special-purpose hardware.

At 1905, the base station may identify that the base station is operating within a broadcast network and in communication with one or more user equipment (UEs) via a dedicated carrier in accordance with a first numerology. The operations of 1905 may be performed according to the methods described herein. In some examples, aspects of the operations of 1905 may be performed by a dedicated carrier manager as described with reference to FIGS. 13 through 16.

At 1910, the base station may allocate a first subframe for transmission of a broadcast control channel and at least one or more reference signals. The operations of 1910 may be performed according to the methods described herein. In some examples, aspects of the operations of 1910 may be performed by a subframe allocation manager as described with reference to FIGS. 13 through 16.

At 1915, the base station may allocate one or more additional subframes, different from the first subframe and having the first numerology, for transmission of the at least one or more reference signals. The operations of 1915 may be performed according to the methods described herein. In some examples, aspects of the operations of 1915 may be performed by a subframe allocation manager as described with reference to FIGS. 13 through 16.

At 1920, the base station may transmit system information indicating that the first subframe and the one or more additional subframes each use the first numerology. The operations of 1920 may be performed according to the methods described herein. In some examples, aspects of the operations of 1920 may be performed by a system information manager as described with reference to FIGS. 13 through 16.

At 1925, the base station may transmit the at least one or more reference signals over the first subframe and the one or more additional subframes. The operations of 1925 may be performed according to the methods described herein. In some examples, aspects of the operations of 1925 may be performed by a reference signal manager as described with reference to FIGS. 13 through 16.

At 1930, the base station may transmit the broadcast control channel over the first subframe. The operations of 1930 may be performed according to the methods described herein. In some examples, aspects of the operations of 1930 may be performed by a broadcast control channel manager as described with reference to FIGS. 13 through 16.

Figure 20:
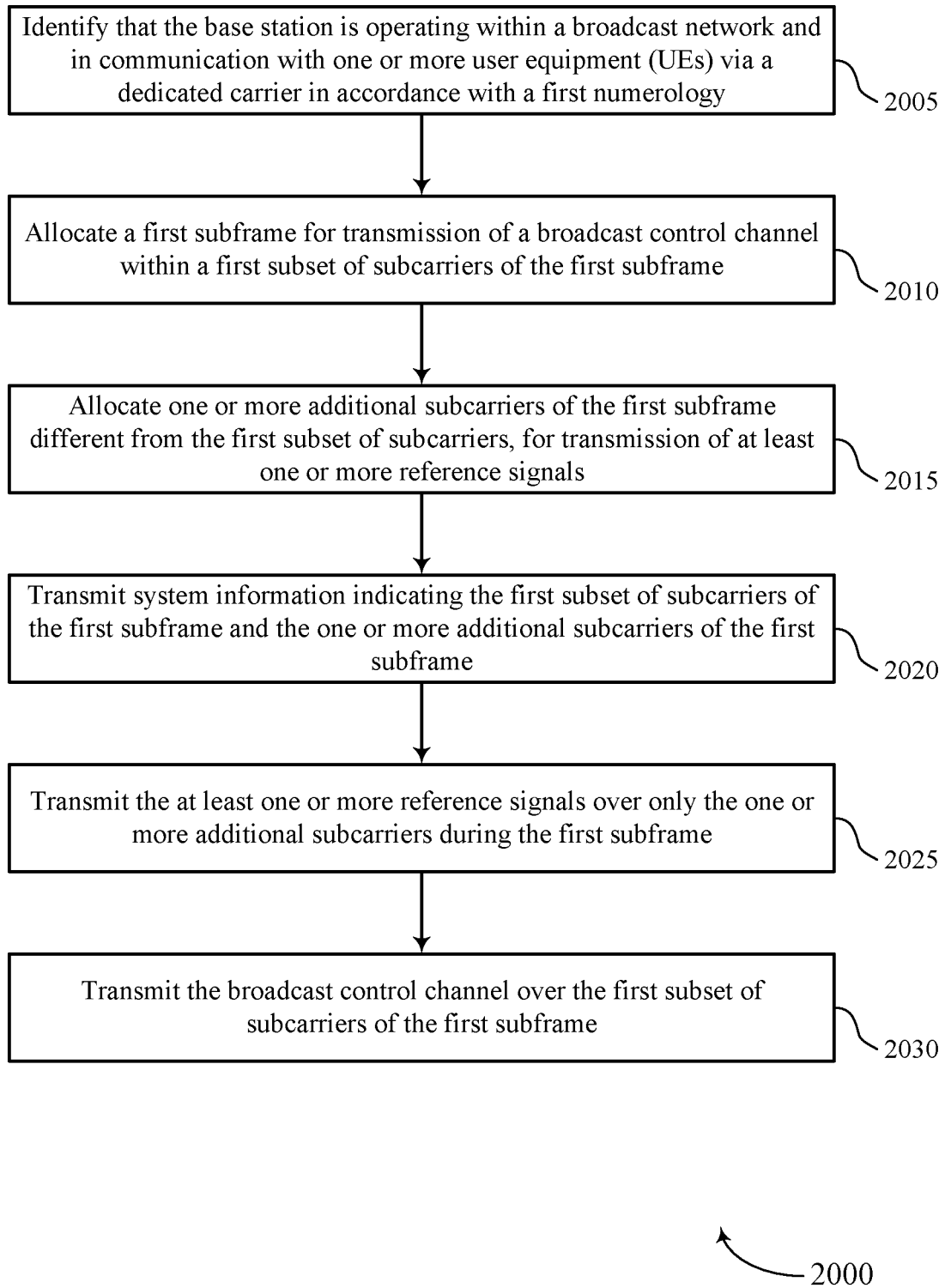

FIG. 20 shows a flowchart illustrating a method 2000 that supports broadcast control channel decoding in a dedicated carrier in accordance with aspects of the present disclosure. The operations of method 2000 may be implemented by a base station 105 or its components as described herein. For example, the operations of method 2000 may be performed by a communications manager as described with reference to FIGS. 13 through 16. In some examples, a base station may execute a set of instructions to control the functional elements of the base station to perform the functions described below. Additionally, or alternatively, a base station may perform aspects of the functions described below using special-purpose hardware.

At 2005, the base station may identify that the base station is operating within a broadcast network and in communication with one or more user equipment (UEs) via a dedicated carrier in accordance with a first numerology. The operations of 2005 may be performed according to the methods described herein. In some examples, aspects of the operations of 2005 may be performed by a dedicated carrier manager as described with reference to FIGS. 13 through 16.

At 2010, the base station may allocate a first subframe for transmission of a broadcast control channel within a first subset of subcarriers of the first subframe. The operations of 2010 may be performed according to the methods described herein. In some examples, aspects of the operations of 2010 may be performed by a subframe allocation manager as described with reference to FIGS. 13 through 16.

At 2015, the base station may allocate one or more additional subcarriers of the first subframe different from the first subset of subcarriers, for transmission of at least one or more reference signals. The operations of 2015 may be performed according to the methods described herein. In some examples, aspects of the operations of 2015 may be performed by a subcarrier identification manager as described with reference to FIGS. 13 through 16.

At 2020, the base station may transmit system information indicating the first subset of subcarriers of the first subframe and the one or more additional subcarriers of the first subframe. The operations of 2020 may be performed according to the methods described herein. In some examples, aspects of the operations of 2020 may be performed by a system information manager as described with reference to FIGS. 13 through 16.

At 2025, the base station may transmit the at least one or more reference signals over only the one or more additional subcarriers during the first subframe. The operations of 2025 may be performed according to the methods described herein. In some examples, aspects of the operations of 2025 may be performed by a reference signal manager as described with reference to FIGS. 13 through 16.

At 2030, the base station may transmit the broadcast control channel over the first subset of subcarriers of the first subframe. The operations of 2030 may be performed according to the methods described herein. In some examples, aspects of the operations of 2030 may be performed by a broadcast control channel manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous examples or aspects described herein.

Example 1

A method for wireless communications at a user equipment (UE), comprising: identifying that the UE is in communication with a broadcast network via a dedicated carrier in accordance with a first numerology; receiving system information from the network; identifying, based at least in part on the system information, a first subframe allocated for reception of a broadcast control channel and at least one or more reference signals; identifying one or more additional subframes, different from the first subframe, as having the first numerology; receiving the one or more reference signals during the first subframe and during the one or more additional subframes; and decoding the broadcast control channel based at least in part on the one or more reference signals.

Example 2

The method of example 1, wherein the first subframe and the one or more additional subframes are each one-symbol subframes as a result of using the first numerology.

Example 3

The method of any of examples 1 to 2 further comprising: identifying a numerology indicator in the system information; and determining, based at least in part on the numerology indicator, that each of the one or more additional subframes has the first numerology.

Example 4

The method of example 3, wherein the numerology indicator comprises one bit.

Example 5

The method of any of examples 1 to 4, wherein the system information further indicates that the one or more additional subframes are allocated for reception of the at least one or more reference signals.

Example 6

The method of any of examples 1 to 5, further comprising: receiving a subframe allocation indicator in the system information; and determining the one or more additional subframes from the subframe allocation indicator.

Example 7

The method of example 6, wherein the subframe allocation indicator comprises a plurality of bits or a bitmap.

Example 8

The method of any of examples 1 to 7, wherein identifying the one or more additional subframes comprises:

determining that the one or more additional subframes have the first numerology based at least in part on a predetermined relationship between the first subframe and the one or more additional subframes.

Example 9

The method of any of examples 1 to 8, further comprising: identifying, based at least in part on the system information, an adjacent subframe to the first subframe, the adjacent subframe comprising the one or more additional subframes, wherein identifying the one or more additional subframes is based at least in part on the identifying the adjacent subframe.

Example 10

The method of any of examples 1 to 9, wherein the one or more additional subframes having the first numerology comprises at least two subframes.

Example 11

The method of any of examples 1 to 10, further comprising: receiving a periodic cell acquisition subframe; and identifying that the first subframe and the one or more additional subframes are within a same period of the cell acquisition subframe such that the first subframe and the one or more additional subframes are within a same multicast-broadcast single-frequency network (MBSFN) area.

Example 12

The method of example 11, wherein each subframe within the same period of the cell acquisition subframe, but not including the cell acquisition subframe, has the first numerology.

Example 13

The method of any of examples 1 to 12, wherein the broadcast control channel is a multicast control channel (MCCH).

Example 14

The method of any of examples 1 to 13, wherein the first subframe and the one or more additional subframes are within a same multicast-broadcast single-frequency network (MBSFN) area.

Example 15

A method for wireless communications at a user equipment (UE), comprising: identifying that the UE is in communication with a broadcast network via a dedicated carrier in accordance with a first numerology; receiving system information from the network; identifying, based at least in part on the system information, a first subframe allocated for reception of a broadcast control channel within a first subset of subcarriers of the first subframe; identifying one or more additional subcarriers of the first subframe different from the first subset of subcarriers, as being allocated for reception of at least one or more reference signals; receiving the one or more reference signal during only the first subframe; and decoding the broadcast control channel based at least in part on the one or more reference signals.

Example 16

The method of example 15, wherein the first subframe is a one-symbol subframe as a result of using the first numerology.

Example 17

The method of any of examples 15 to 16, further comprising: identifying, based at least in part on the system information, that a first reference signal pattern within the one or more additional subcarriers of the subframe is different than a second reference signal pattern for one or more additional subframes different from the first subframe.

Example 18

The method of any of examples 15 to 17, wherein a reference signal density of the first reference signal pattern is more dense in a frequency domain than a reference signal density of the second reference signal pattern.

Example 19

The method of any of examples 15 to 18, wherein the one or more subcarriers of the first subframe have the first numerology and the one or more additional subframes have a second numerology that is different than the first numerology.

Example 20

The method of any of examples 15 to 18, wherein the broadcast control channel is a multicast control channel (MCCH).

Example 21

A method for wireless communications at a base station, comprising: identifying that the base station is operating within a broadcast network and in communication with one or more user equipment (UEs) via a dedicated carrier in accordance with a first numerology; allocating a first subframe for transmission of a broadcast control channel and at least one or more reference signals; allocating one or more additional subframes, different from the first subframe and having the first numerology, for transmission of the at least one or more reference signals; transmitting system information indicating that the first subframe and the one or more additional subframes each use the first numerology; transmitting the at least one or more reference signals over the first subframe and the one or more additional subframes; and transmitting the broadcast control channel over the first subframe.

Example 22

The method of example 21, wherein the first subframe and the one or more additional subframes are each one-symbol subframes as a result of using the first numerology.

Example 23

The method of any of examples 21 to 22, wherein transmitting the system information further comprises:

transmitting, in the system information, a numerology indicator that indicates that each of the one or more additional subframes has the first numerology.

Example 24

The method of example 23, wherein the numerology indicator comprises one bit.

Example 25

The method of any of examples 21 to 24, wherein the system information further indicates that the one or more additional subframes are allocated for reception of the at least one or more reference signals.

Example 26

The method of any of examples 21 to 25, wherein transmitting the system information further comprises: transmitting, in the system information, a subframe allocation indicator that indicates the one or more additional subframes.

Example 27

The method of example 26, wherein the subframe allocation indicator comprises a plurality of bits or a bitmap.

Example 28

The method of any of examples 21 to 27, further comprising: identifying a predetermined relationship between the first subframe and the one or more additional subframes, wherein allocating the first subframe and allocating the one or more additional subframes is based at least in part on the predetermined relationship.

Example 29

The method of any of examples 21 to 28, further comprising: identifying an adjacent subframe to the first subframe, wherein allocating the one or more additional subframes further comprises allocating the one or more additional subframes in the adjacent subframe.

Example 30

The method of any of examples 21 to 29, wherein the one or more additional subframes having the first numerology comprises at least two subframes.

Example 31

The method of any of examples 21 to 30, further comprising: transmitting a periodic cell acquisition subframe; and allocating the first subframe and the one or more additional subframes within a same period of the cell acquisition subframe such that the first subframe and the one or more additional subframes are within a same multicast-broadcast single-frequency network (MBSFN) area.

Example 32

The method of example 31, wherein each subframe within the same period of the cell acquisition subframe, but not including the cell acquisition subframe, has the first numerology.

Example 33

The method of any of examples 21 to 32, wherein the broadcast control channel is a multicast control channel (MCCH).

Example 34

A method for wireless communications at a base station, comprising: identifying that the base station is operating within a broadcast network and in communication with one or more user equipment (UEs) via a dedicated carrier in accordance with a first numerology; allocating a first subframe for transmission of a broadcast control channel within a first subset of subcarriers of the first subframe; allocating one or more additional subcarriers of the first subframe different from the first subset of subcarriers, for transmission of at least one or more reference signals; transmitting system information indicating the first subset of subcarriers of the first subframe and the one or more additional subcarriers of the first subframe; transmitting the at least one or more reference signals over only the one or more additional subcarriers during the first subframe; and transmitting the broadcast control channel over the first subset of subcarriers of the first subframe.

Example 35

The method of example 34, wherein the first subframe is a one-symbol subframe as a result of using the first numerology.

Example 36

The method of any of examples 34 to 35, further comprising: transmitting, in the system information, an indication of a first reference signal pattern within the one or more additional subcarriers of the subframe that is different than a second reference signal pattern for one or more additional subframes different from the first subframe.

Example 37

The method of any of examples 34 to 36, wherein a reference signal density of the first reference signal pattern is more dense in a frequency domain than a reference signal density of the second reference signal pattern.

Example 38

The method of any of examples 34 to 37, wherein the one or more subcarriers of the first subframe have the first numerology and the one or more additional subframes have a second numerology that is different than the first numerology.

Example 39

The method of any of examples 34 to 38, wherein the broadcast control channel is a multicast control channel (MCCH).

Example 40

An apparatus comprising at least one means for performing a method of any of examples 1 to 20.

Example 41

An apparatus comprising at least one means for performing a method of any of examples 1 21 to 39.

Example 42

An apparatus for wireless communications comprising a processor; memory in electronic communication with the processor; and instructions stored in the memory and executable by the processor to cause the apparatus to perform a method of any of examples 1 to 20.

Example 43

An apparatus for wireless communications comprising a processor; memory in electronic communication with the processor; and instructions stored in the memory and executable by the processor to cause the apparatus to perform a method of any of examples 21 to 39.

Example 44

A non-transitory computer-readable medium storing code for wireless communications, the code comprising instructions executable by a processor to perform a method of any of examples 1 to 20.

Example 45

A non-transitory computer-readable medium storing code for wireless communications, the code comprising instructions executable by the processor to perform a method of any of examples 21-39.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a broadcast message from a broadcast network, the broadcast network in communication with the UE via a dedicated carrier in accordance with a first numerology, wherein the broadcast message allocates a first subframe for reception of a broadcast control channel and one or more reference signals, and wherein the broadcast message implicitly indicates one or more additional subframes preceding the first subframe for reception of the one or more reference signals based at least in part on a relationship between the first subframe and the one or more additional subframes;
   receiving the one or more reference signals during the first subframe and during the one or more additional subframes preceding the first subframe based at least in part on the relationship between the first subframe and the one or more additional subframes, wherein the one or more additional subframes and the first subframe allocated within a same multicast-broadcast single-frequency network (MBSFN) area, and wherein the one or more additional subframes have the first numerology based on the one or more additional subframes and the first subframe being allocated within the same MBSFN area; and
   decoding the broadcast control channel based at least in part on the one or more reference signals.

2. The method of claim 1 further comprising:
   identifying a numerology indicator in the broadcast message; and
   determining, based at least in part on the numerology indicator, that each of the one or more additional subframes has the first numerology.

3. The method of claim 1, wherein the broadcast message further indicates that the one or more additional subframes are allocated for reception of the one or more reference signals.

4. The method of claim 1, further comprising:
   receiving a subframe allocation indicator in the broadcast message; and
   determining the one or more additional subframes from the subframe allocation indicator.

5. The method of claim 4, wherein the subframe allocation indicator comprises a plurality of bits or a bitmap.

6. The method of claim 1, further comprising:
determining that the one or more additional subframes have the first numerology based at least in part on the relationship between the first subframe and the one or more additional subframes.

7. The method of claim 1, wherein the one or more additional subframes having the first numerology comprises at least two subframes.

8. The method of claim 1, further comprising:
receiving a periodic cell acquisition subframe; and
identifying that the first subframe and the one or more additional subframes are within a same period of the periodic cell acquisition subframe such that the first subframe and the one or more additional subframes are within the same MBSFN area.

9. The method of claim 8, wherein each subframe within the same period of the periodic cell acquisition subframe, but not including the periodic cell acquisition subframe, has the first numerology.

10. The method of claim 1, wherein the broadcast control channel is a multicast control channel (MCCH).

11. A method for wireless communications at a user equipment (UE), comprising:
receiving a broadcast message from a broadcast network, the broadcast network in communication with the UE via a dedicated carrier in accordance with a first numerology, wherein the broadcast message allocates a first subframe for reception of one or more reference signals associated with a broadcast control channel within a first subset of subcarriers of the first subframe, and wherein the broadcast message indicates a second subset of subcarriers of the first subframe for reception of one or more additional reference signals, the second subset of subcarriers different from the first subset of subcarriers;
receiving, during only the first subframe, the one or more reference signals having a first numerology associated with the broadcast control channel on the first subset of subcarriers according to a first reference signal pattern of the first subframe;
receiving, during the first subframe, the one or more additional reference signals having a second numerology different from the first numerology associated with the broadcast control channel on a second subset of subcarriers of the first subframe different from the first subset of subcarriers according to a second reference signal pattern of the first subframe, wherein a reference signal density of the first reference signal pattern is more dense in a frequency domain than a reference signal density of the second reference signal pattern; and
decoding the broadcast control channel based at least in part on the one or more reference signals.

12. The method of claim 11, further comprising:
identifying, based at least in part on the broadcast message, that the second reference signal pattern within the second subset of subcarriers of the first subframe is different than a reference signal pattern for one or more additional subframes different from the first subframe.

13. A method for wireless communications at a network device, comprising:
allocating a first subframe within a multicast-broadcast single-frequency network (MBSFN) area for transmission of a broadcast control channel and one or more reference signals to a user equipment (UE), the UE in communication with a broadcast network via a dedicated carrier in accordance with a first numerology, wherein the network device is operating within the broadcast network;
allocating one or more additional subframes adjacent to and preceding the allocated first subframe within the MBSFN area for transmission of the one or more reference signals based at least in part on a relationship between the first subframe and the one or more additional subframes, wherein the one or more additional subframes have the first numerology based at least in part on the one or more additional subframes and the first subframe being allocated within the MBSFN area;
transmitting a broadcast message indicating that the first subframe is allocated for reception of the broadcast control channel and the one or more reference signals, wherein the broadcast message implicitly indicates that the one or more additional subframes preceding the first subframe are allocated for reception of the one or more reference signals based at least in part on the relationship between the first subframe and the one or more additional subframes;
transmitting the one or more reference signals over the first subframe and the one or more additional subframes; and
transmitting the broadcast control channel over the first subframe.

14. The method of claim 13, wherein the first subframe and the one or more additional subframes are each one-symbol subframes as a result of using the first numerology.

15. The method of claim 13, wherein transmitting the broadcast message further comprises:
transmitting, in the broadcast message, a numerology indicator that indicates that each of the one or more additional subframes has the first numerology.

16. The method of claim 13, wherein the broadcast message further indicates that the one or more additional subframes are allocated for reception of the one or more reference signals.

17. The method of claim 13, wherein transmitting the broadcast message further comprises:
transmitting, in the broadcast message, a subframe allocation indicator that indicates the one or more additional subframes.

18. The method of claim 13, further comprising:
identifying the relationship between the first subframe and the one or more additional subframes, wherein allocating the first subframe and allocating the one or more additional subframes is based at least in part on identifying the relationship.

19. The method of claim 13, wherein the one or more additional subframes having the first numerology comprises at least two subframes.

20. The method of claim 13, further comprising:
transmitting a periodic cell acquisition subframe; and
allocating the first subframe and the one or more additional subframes within a same period of the periodic cell acquisition subframe such that the first subframe and the one or more additional subframes are within the MBSFN area.

21. A method for wireless communications at a network device, comprising:
allocating a first subframe for transmission of one or more reference signals associated with a broadcast control channel within a first subset of subcarriers of the first subframe, the transmission for a user equipment (UE) in communication with a broadcast network via a dedicated carrier in accordance with a first numerology, wherein the network device is operating within the broadcast network;

allocating a second set of subcarriers of the first subframe different from the first subset of subcarriers, for transmission of one or more additional reference signals;

transmitting a broadcast message indicating that the first subset of subcarriers of the first subframe are allocated for reception of the one or more reference signals and the second set of subcarriers of the first subframe are allocated for reception of the one or more additional reference signals;

transmitting, during only the first subframe, one or more reference signals having the first numerology associated with the broadcast control channel on the first subset of subcarriers according to a first reference signal pattern of the first subframe;

transmitting, during the first subframe, the one or more reference signals having a second numerology different from the first numerology associated with the broadcast control channel over the second subset of subcarriers different from the first subset of subcarriers according to a second reference signal pattern of the first subframe, wherein a reference signal density of the first reference signal pattern is more dense in a frequency domain than a reference signal density of the second reference signal pattern; and transmitting the broadcast control channel over the first subset of subcarriers of the first subframe.

22. The method of claim 21, wherein the first subframe is a one-symbol subframe as a result of using the first numerology.

23. The method of claim 21, further comprising:
transmitting, in the broadcast message, an indication of the second reference signal pattern within the second subset of subcarriers of the first subframe, wherein the second reference signal pattern is different than a reference signal pattern for one or more additional subframes different from the first subframe.

* * * * *